July 19, 1955  E. E. REYNOLDS  2,713,456
MACHINE FOR TRANSLATING BINARY VALUES TO DECIMAL VALUES
Filed Oct. 24, 1949  20 Sheets-Sheet 1
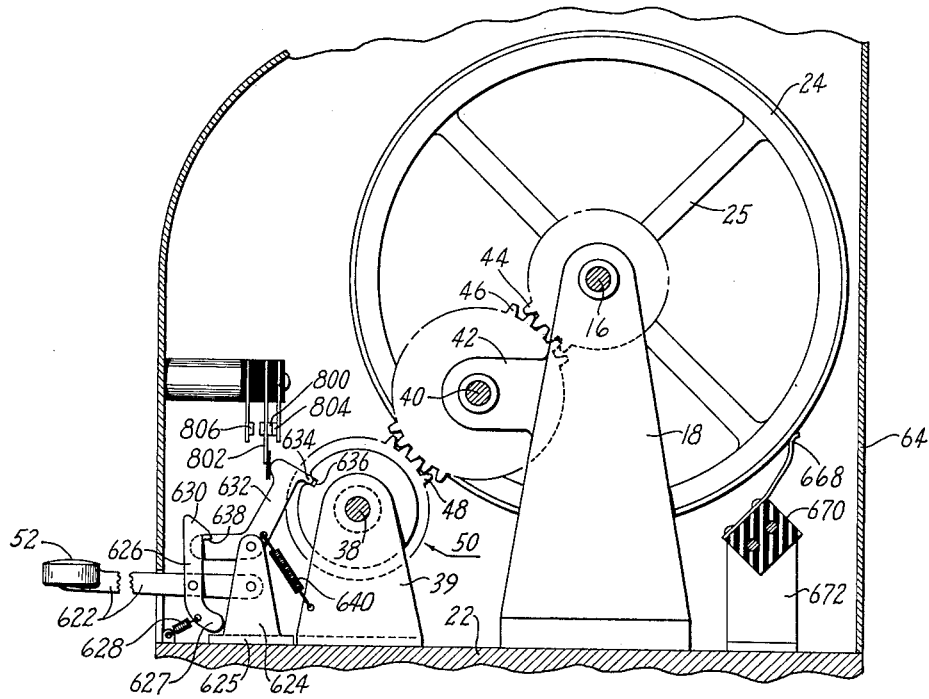
FIG_12_
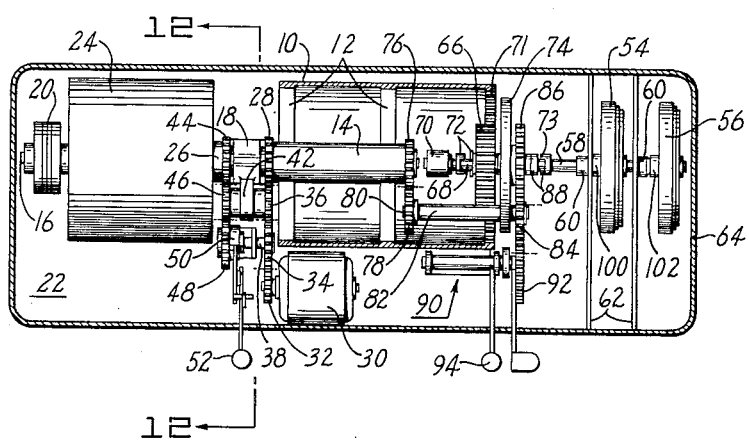
FIG_1_
INVENTOR
Eugene E. Reynolds.
BY
Robert W. Hampton

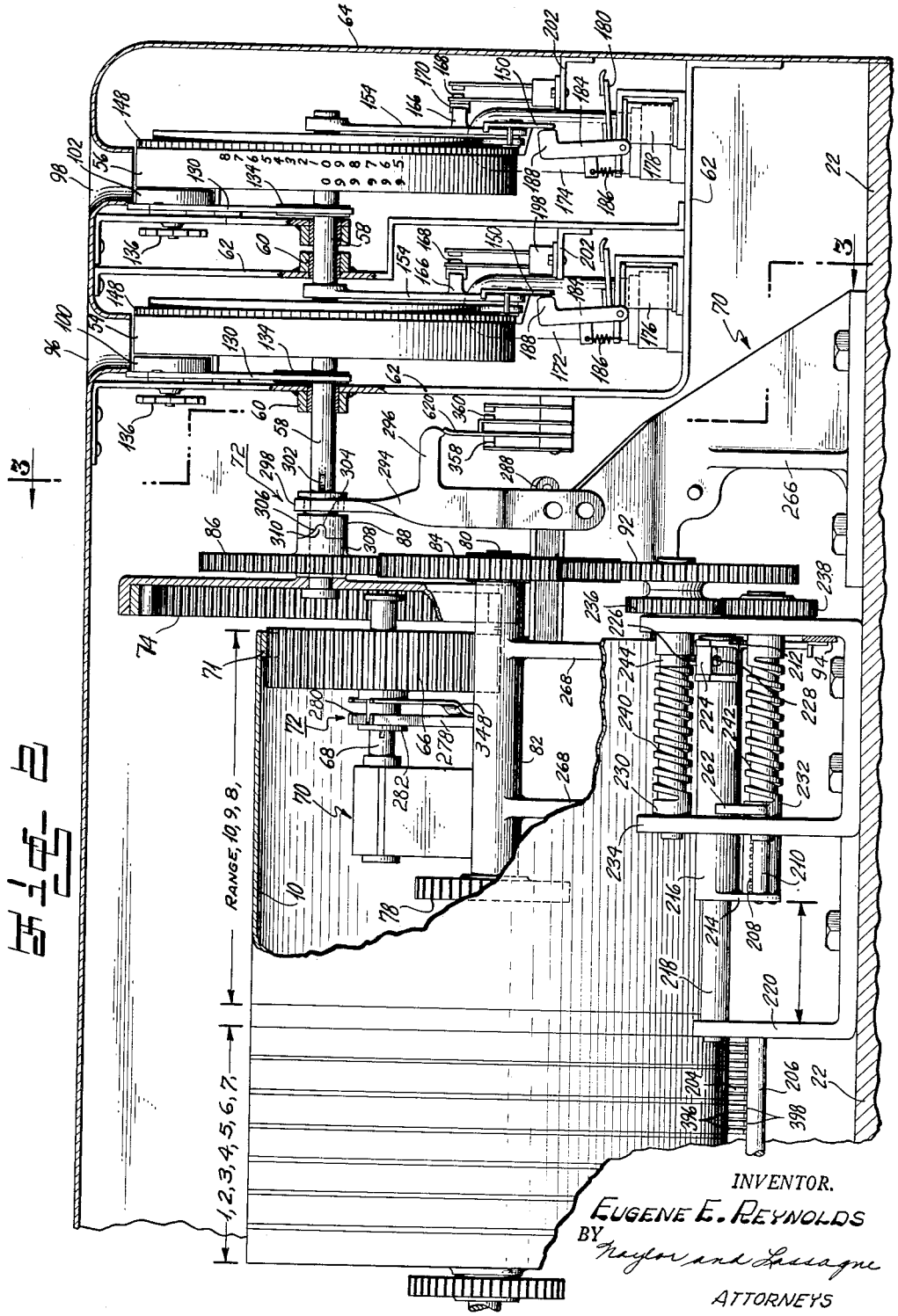

July 19, 1955  E. E. REYNOLDS  2,713,456
MACHINE FOR TRANSLATING BINARY VALUES TO DECIMAL VALUES
Filed Oct. 24, 1949  20 Sheets-Sheet 3

INVENTOR
Eugene E. Reynolds.
BY
Robert W. Hampton

INVENTOR.
*EUGENE E. REYNOLDS*
BY
*Naylor and Lassagne*
ATTORNEYS

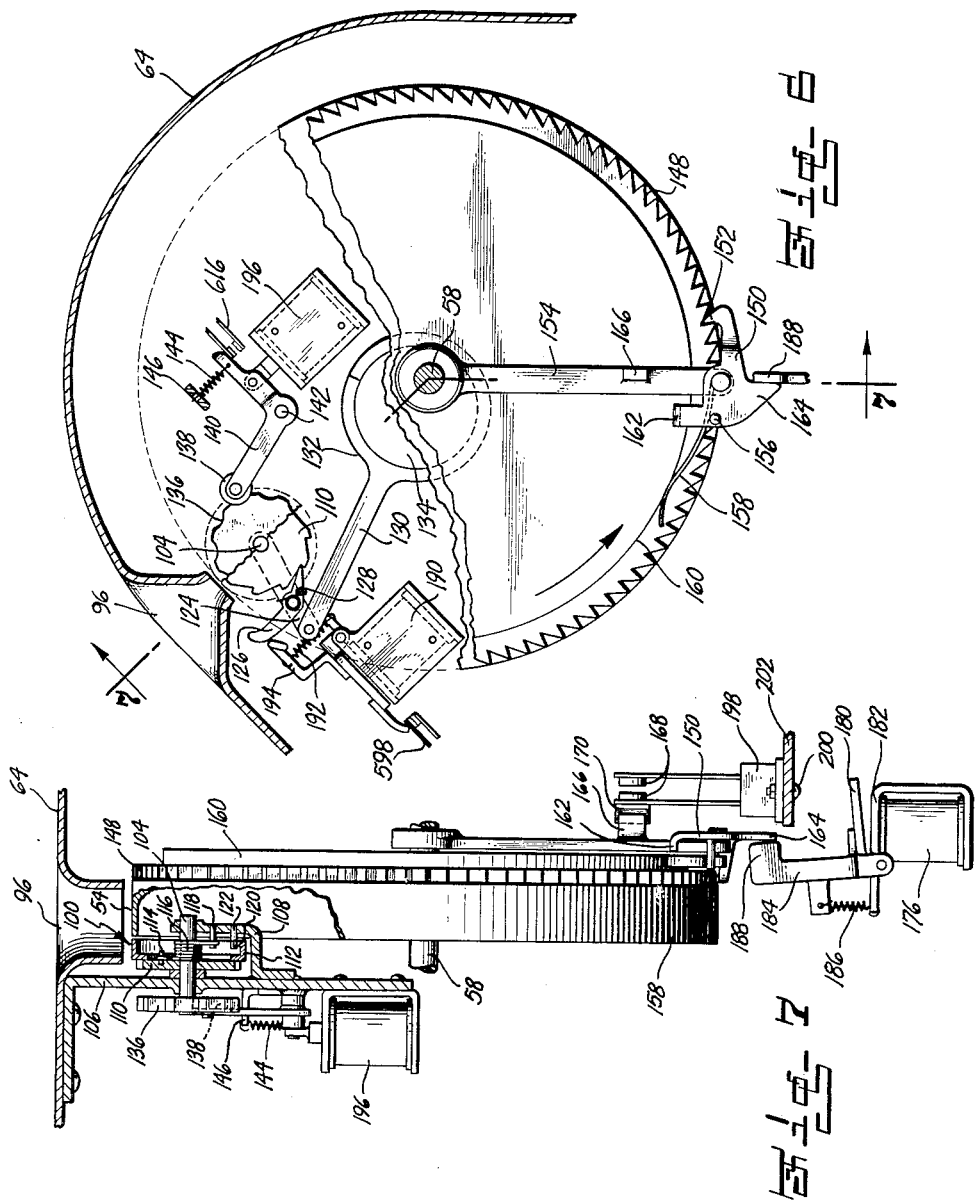

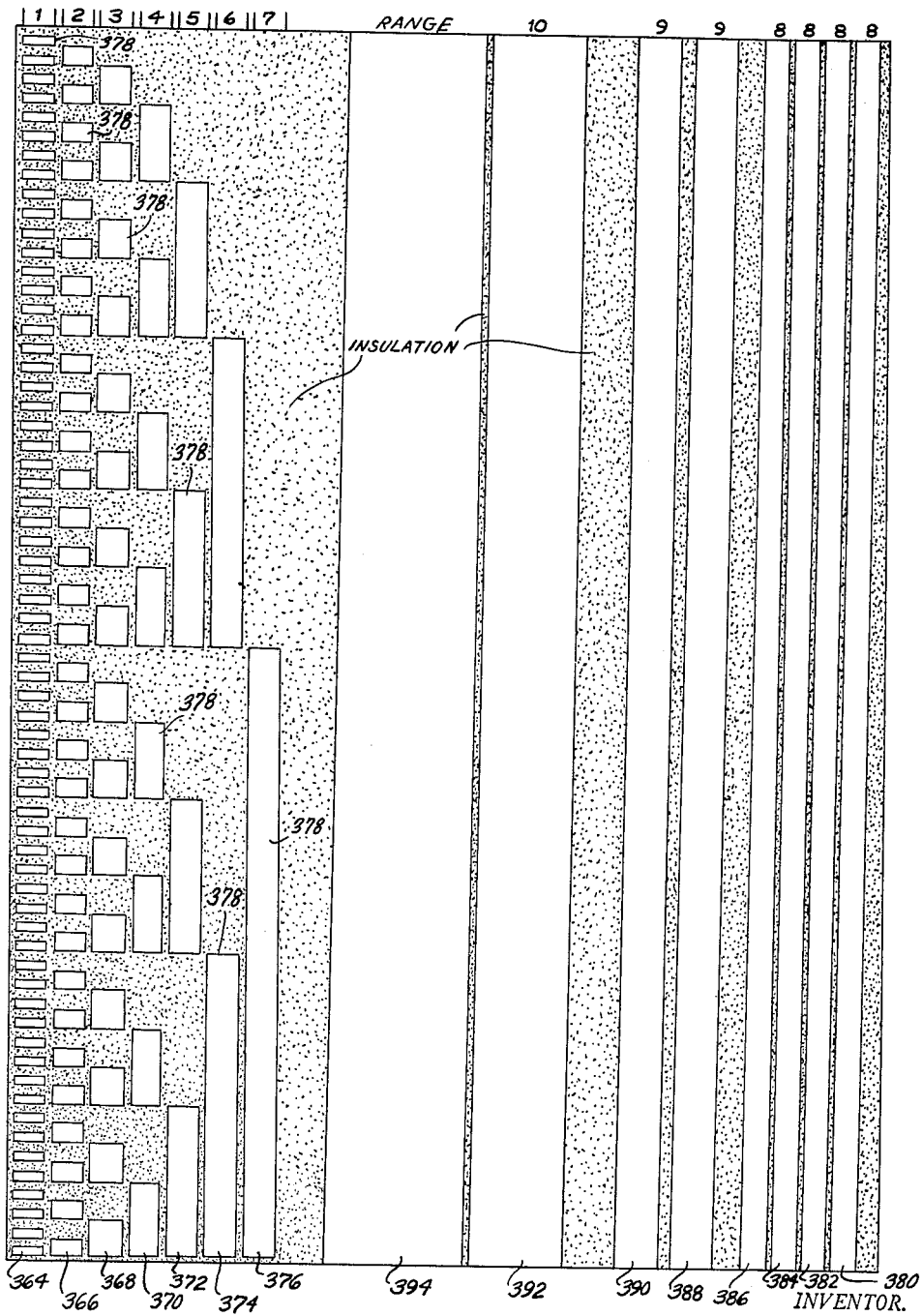

July 19, 1955    E. E. REYNOLDS    2,713,456
MACHINE FOR TRANSLATING BINARY VALUES TO DECIMAL VALUES
Filed Oct. 24, 1949    20 Sheets-Sheet 7
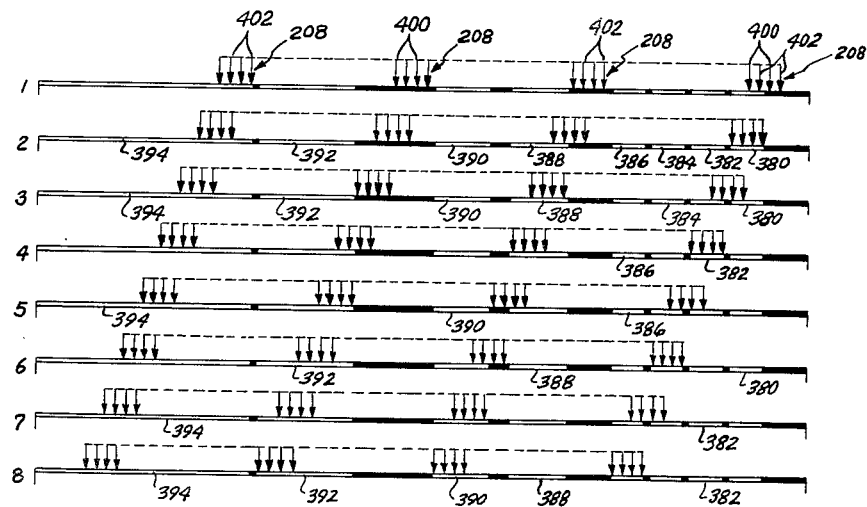
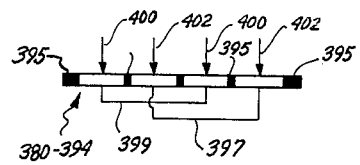
INVENTOR.
EUGENE E. REYNOLDS
BY
ATTORNEYS July 19, 1955     E. E. REYNOLDS     2,713,456
MACHINE FOR TRANSLATING BINARY VALUES TO DECIMAL VALUES
Filed Oct. 24, 1949                                                 20 Sheets-Sheet 8
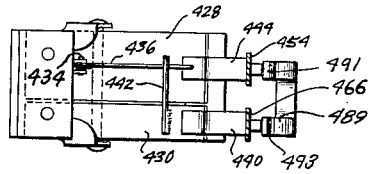
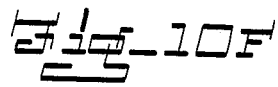
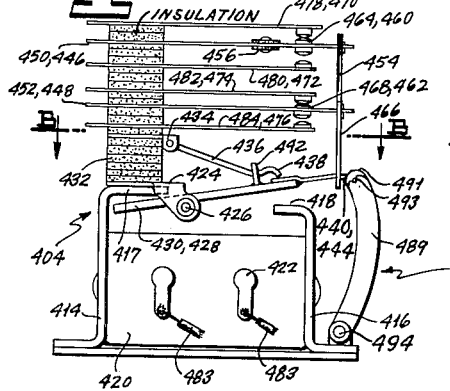
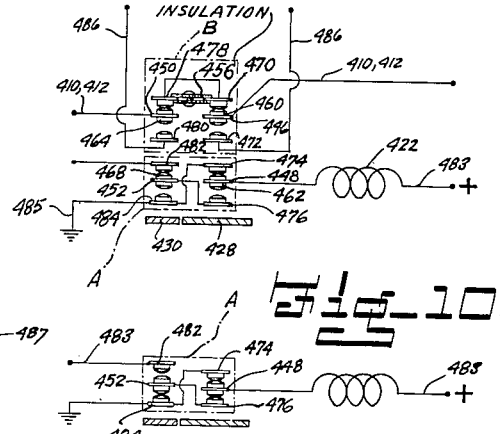
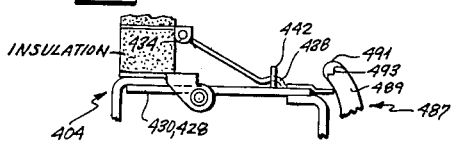
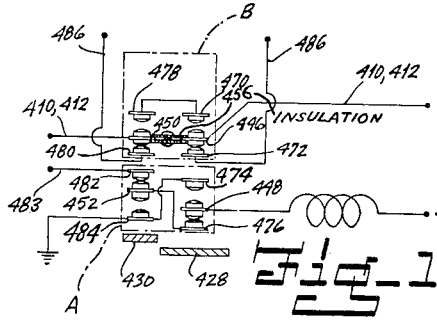
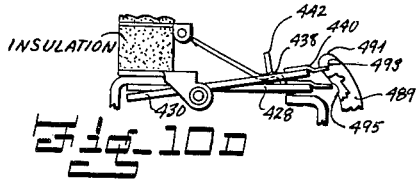
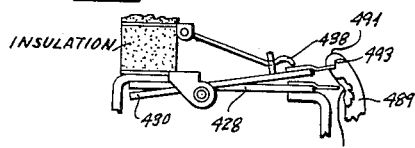
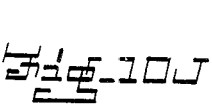
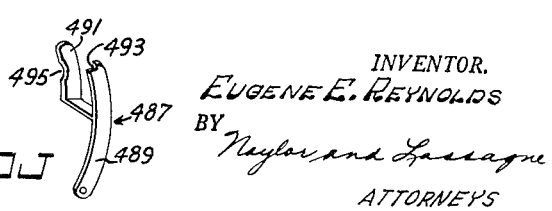
INVENTOR.
EUGENE E. REYNOLDS
BY Naylor and Lassagne
ATTORNEYS

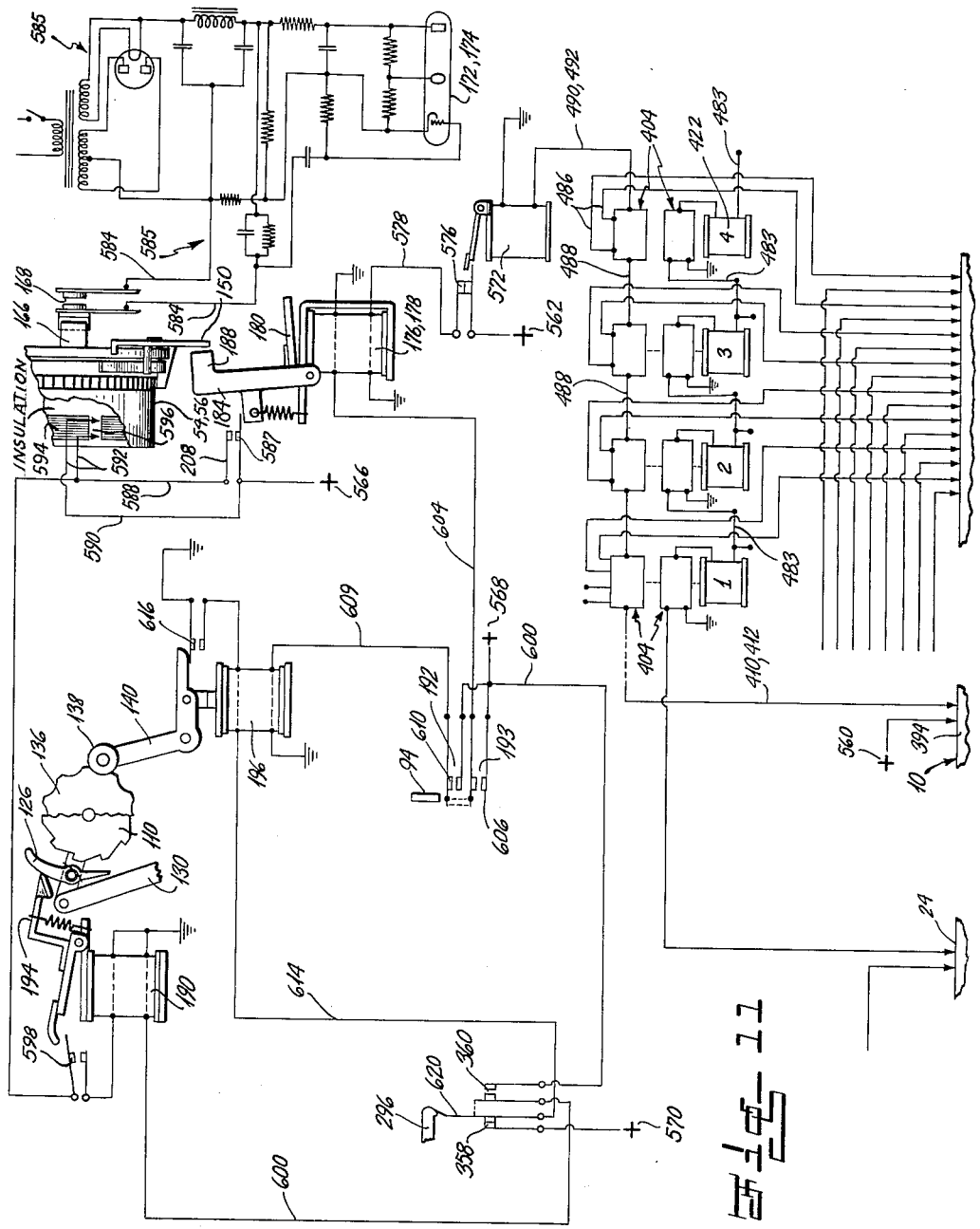

July 19, 1955     E. E. REYNOLDS     2,713,456
MACHINE FOR TRANSLATING BINARY VALUES TO DECIMAL VALUES
Filed Oct. 24, 1949     20 Sheets-Sheet 10
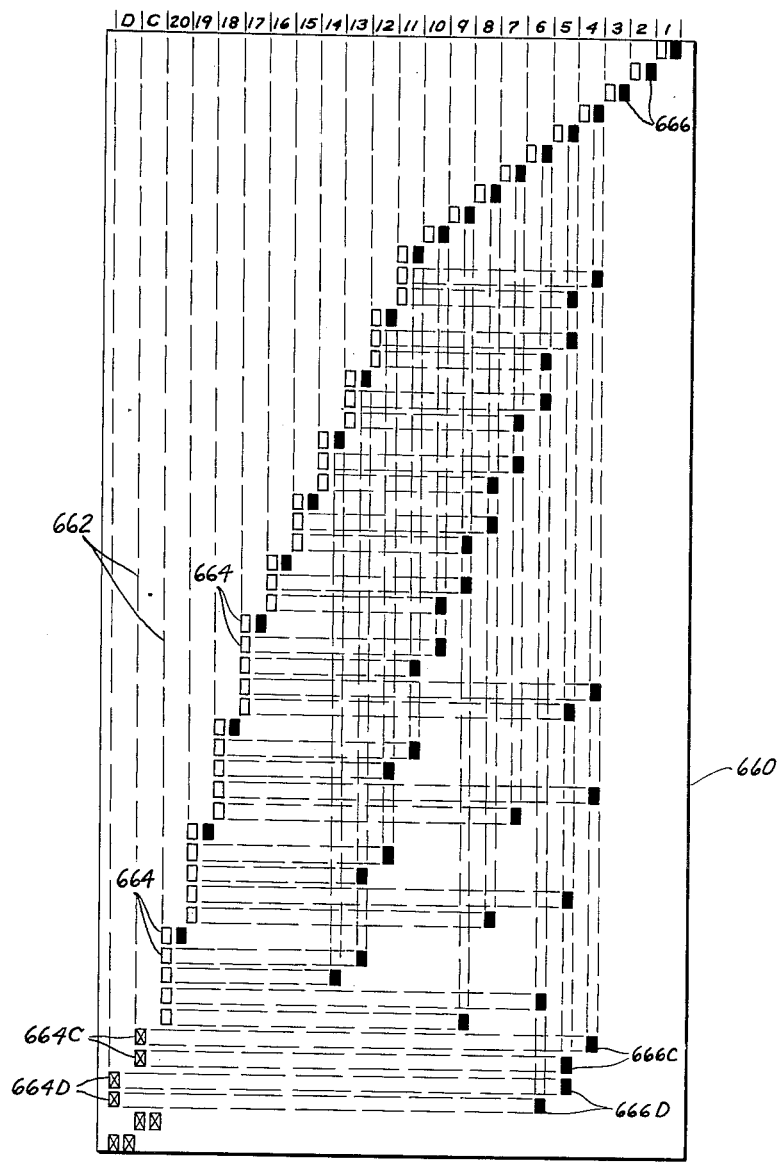
INVENTOR.
EUGENE E. REYNOLDS
BY
Naylor and Lassagne
ATTORNEYS

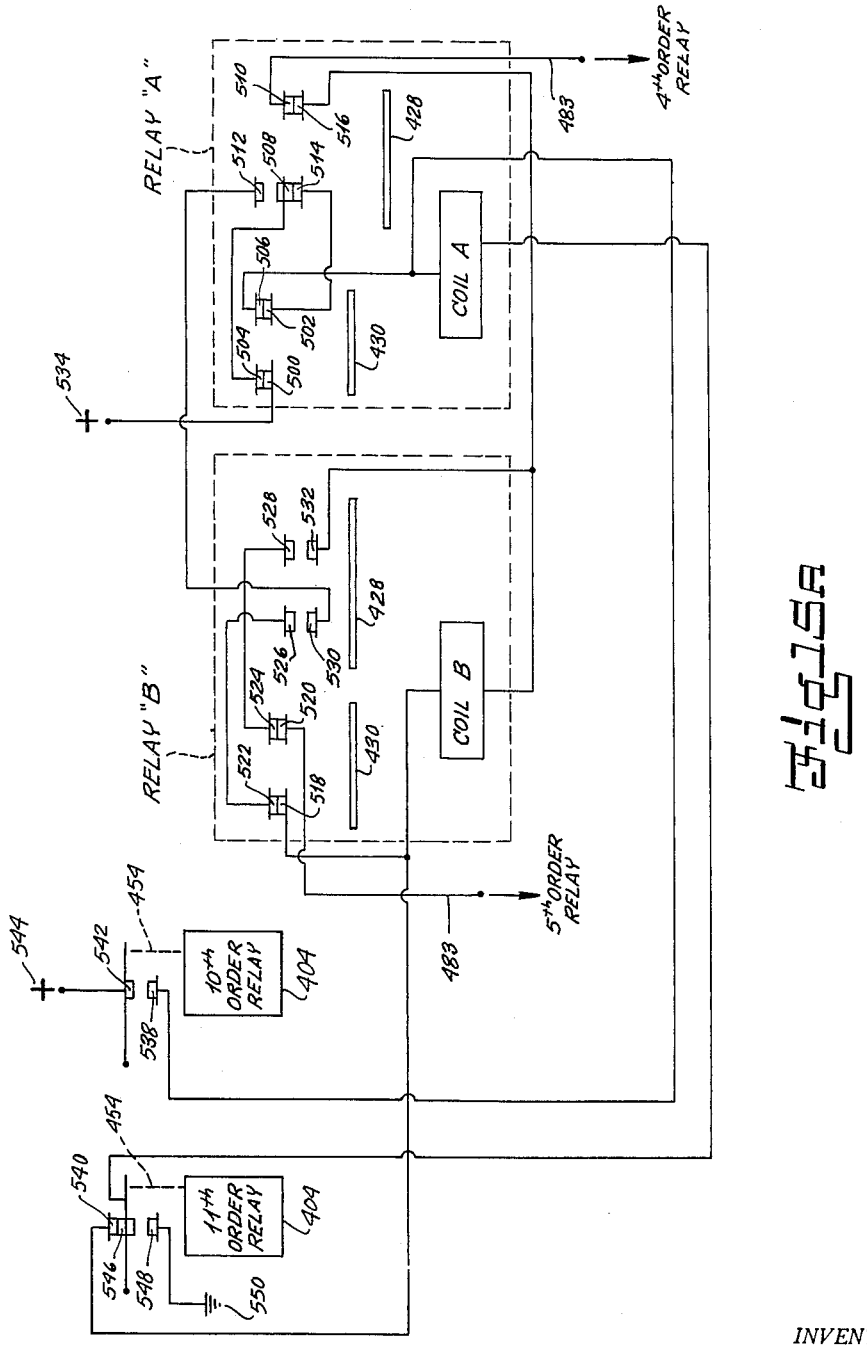

July 19, 1955     E. E. REYNOLDS     2,713,456
MACHINE FOR TRANSLATING BINARY VALUES TO DECIMAL VALUES
Filed Oct. 24, 1949     20 Sheets-Sheet 12

INVENTOR.
EUGENE E. REYNOLDS
BY Naylor and Lassagne
ATTORNEYS

July 19, 1955 — E. E. REYNOLDS — 2,713,456
MACHINE FOR TRANSLATING BINARY VALUES TO DECIMAL VALUES
Filed Oct. 24, 1949 — 20 Sheets-Sheet 13

INVENTOR.
EUGENE E. REYNOLDS
BY Naylor and Lassague
ATTORNEYS

July 19, 1955
E. E. REYNOLDS
2,713,456
MACHINE FOR TRANSLATING BINARY VALUES TO DECIMAL VALUES
Filed Oct. 24, 1949
20 Sheets-Sheet 14
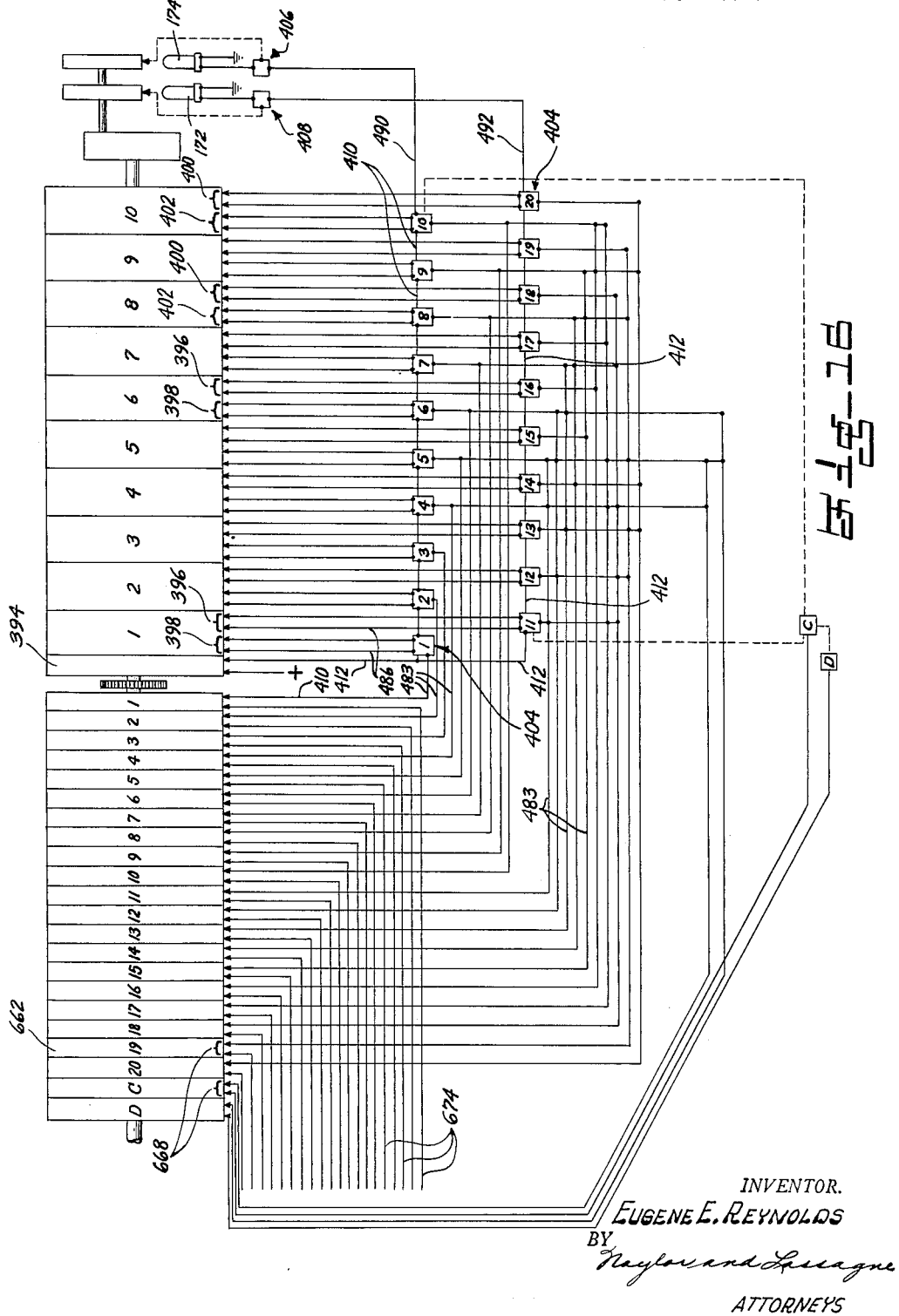

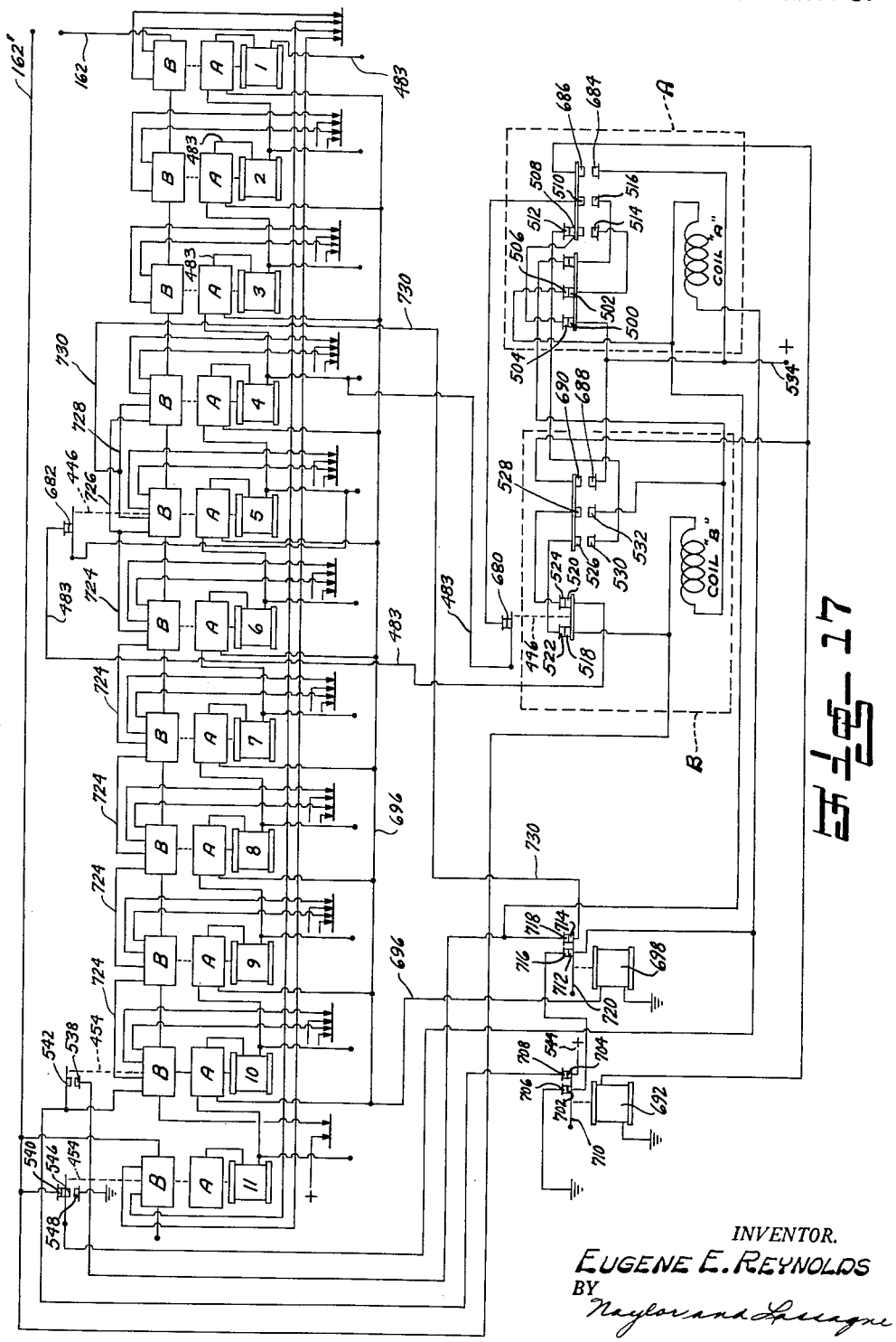

July 19, 1955  E. E. REYNOLDS  2,713,456
MACHINE FOR TRANSLATING BINARY VALUES TO DECIMAL VALUES
Filed Oct. 24, 1949  20 Sheets-Sheet 16
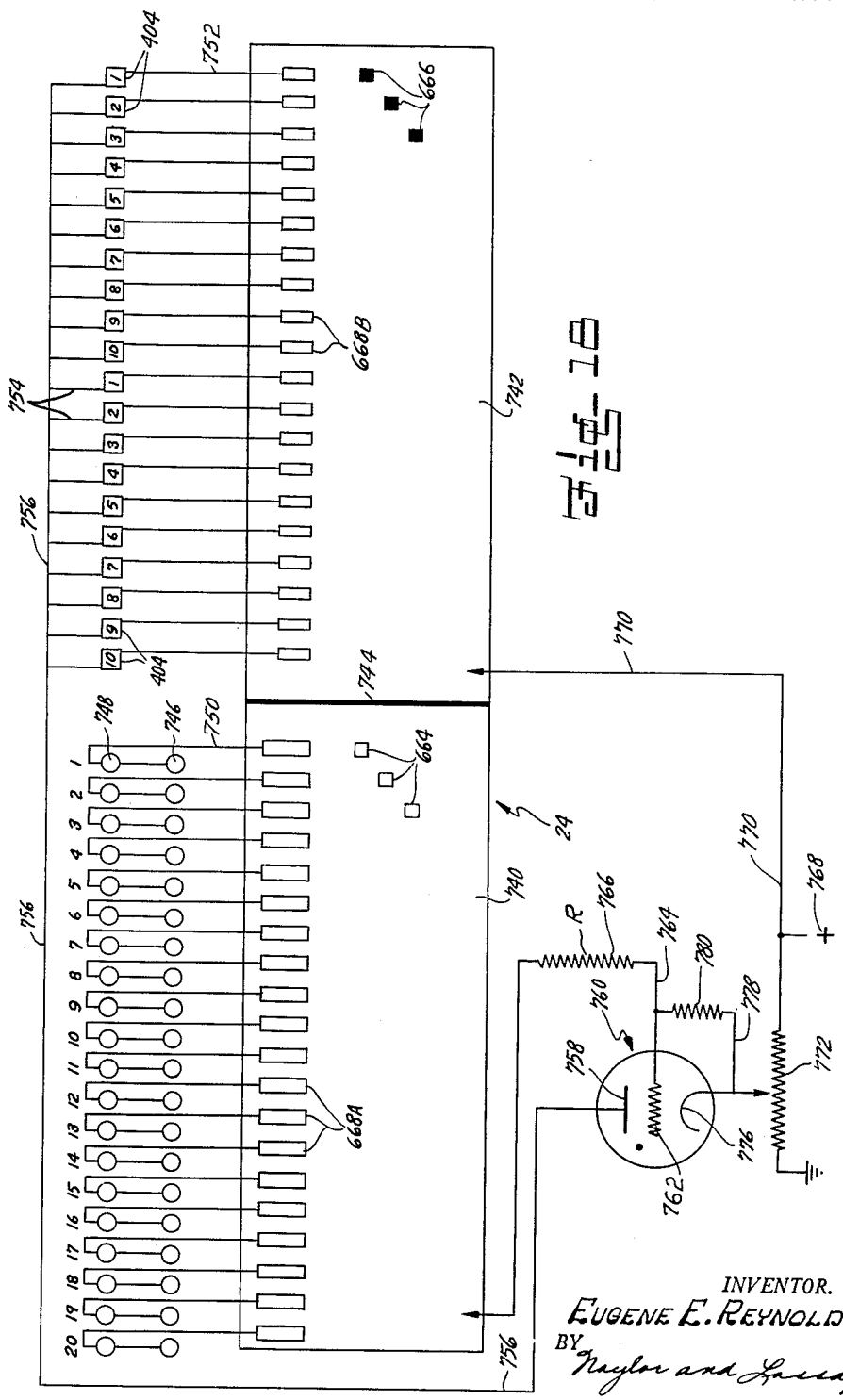
INVENTOR.
EUGENE E. REYNOLDS
BY Naylor and Lassagne
ATTORNEYS

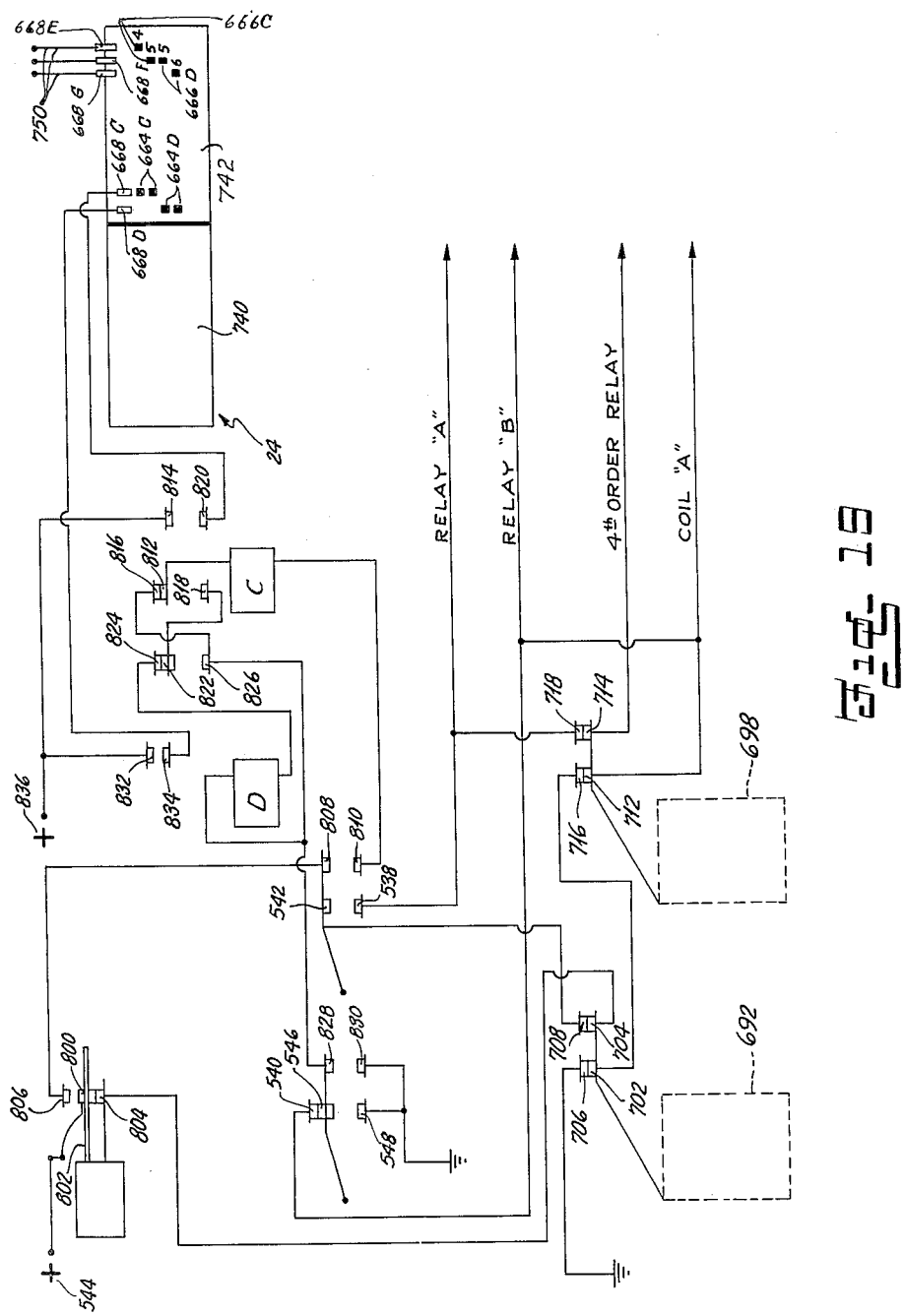

July 19, 1955     E. E. REYNOLDS     2,713,456
MACHINE FOR TRANSLATING BINARY VALUES TO DECIMAL VALUES
Filed Oct. 24, 1949     20 Sheets-Sheet 18

INVENTOR.
EUGENE E. REYNOLDS
BY
ATTORNEYS

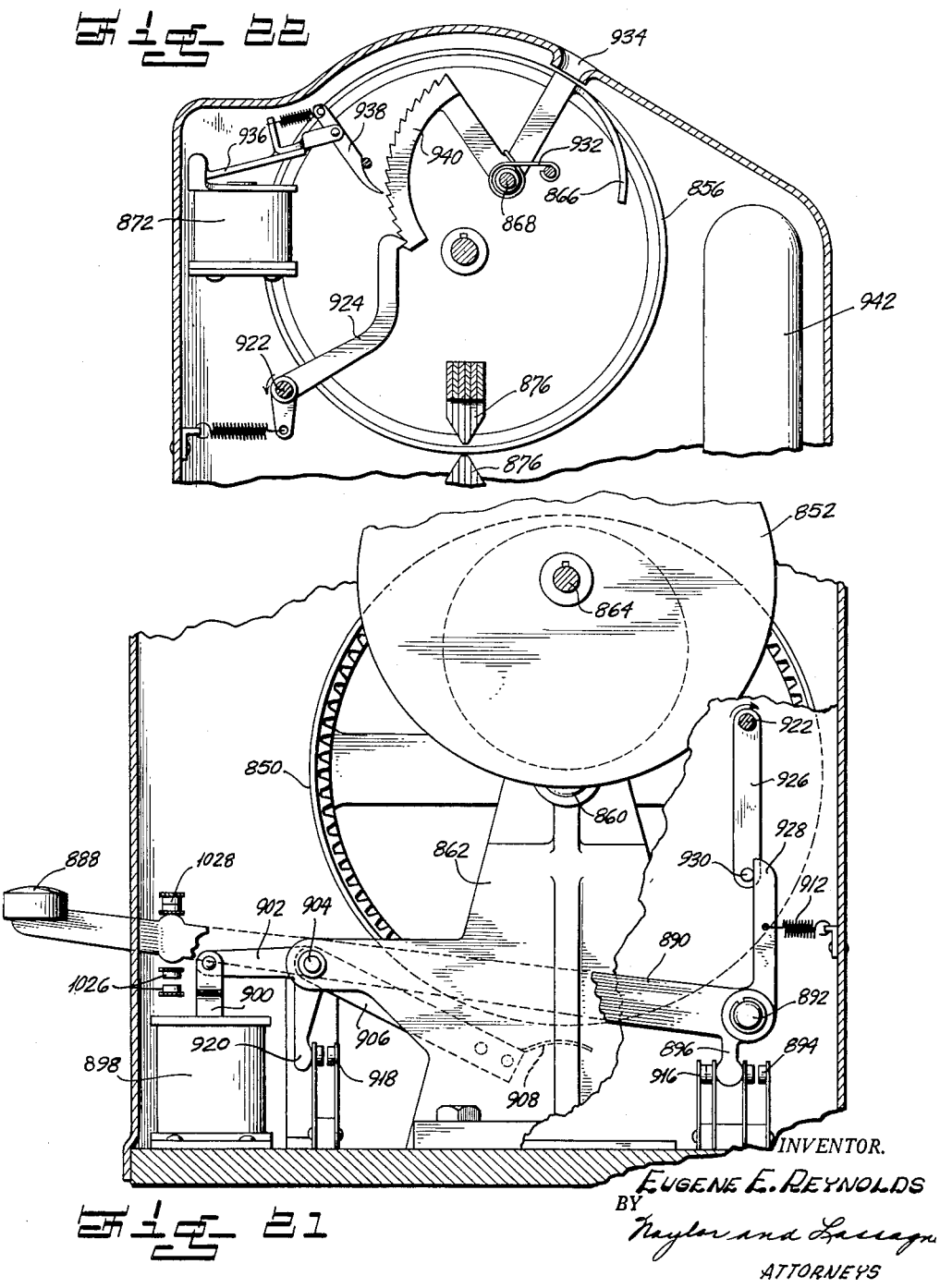

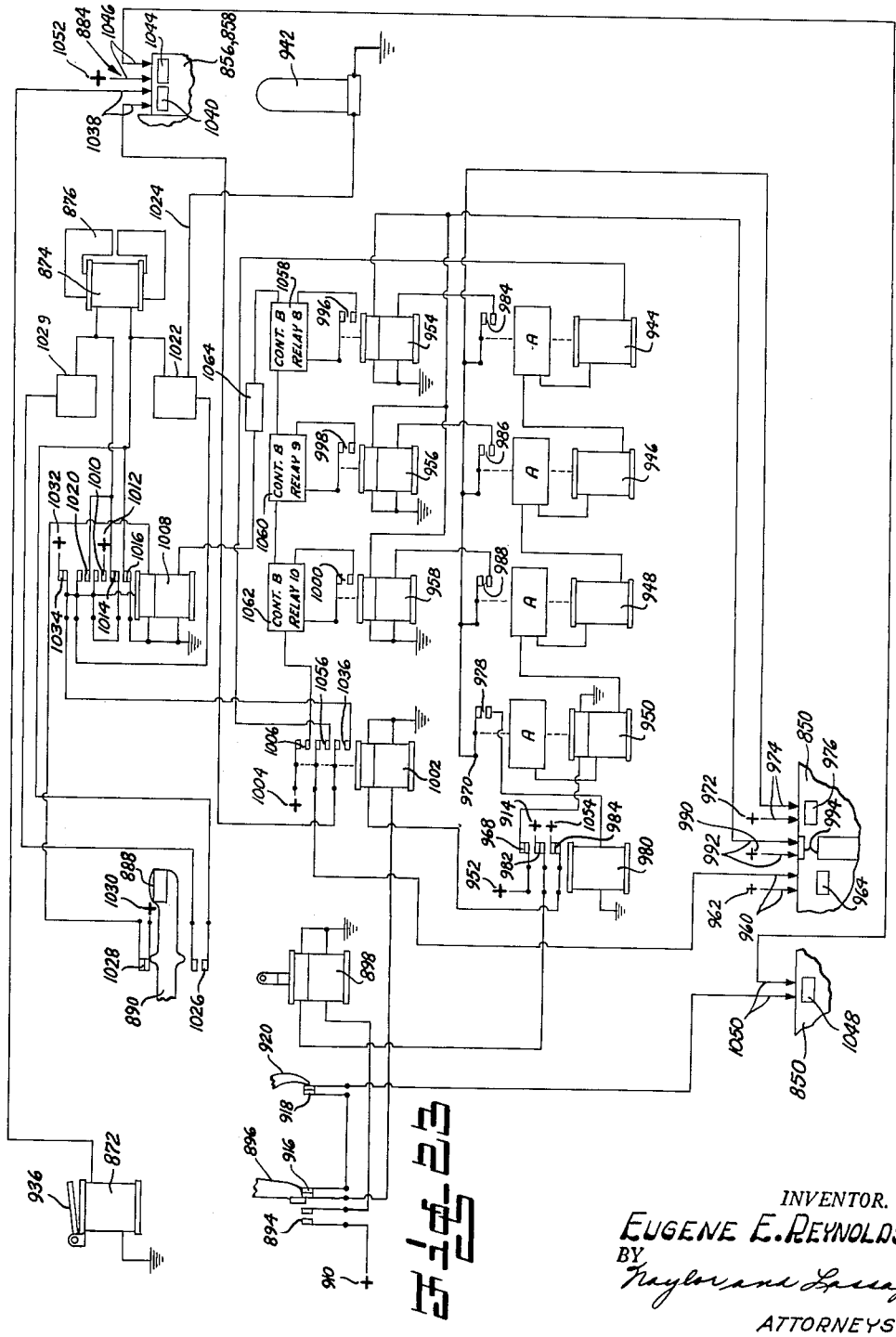

United States Patent Office 2,713,456
Patented July 19, 1955

2,713,456

MACHINE FOR TRANSLATING BINARY VALUES TO DECIMAL VALUES

Eugene E. Reynolds, Richmond, Calif., assignor to Merchant Calculators, Inc., a corporation of California Application October 24, 1949, Serial No. 123,231

28 Claims. (Cl. 235—61)

This invention relates to translating machines, and more particularly to that type of translating machine adapted to translate or convert values expressed in the binary system to equivalent values expressed in the decimal system.

The use of the binary system in electronic calculating machines, and the like, has certain definite advantages over the use of the decimal system. For example, while it requires more orders in the binary system to express a given value than are required to express the same value in the decimal system, values may be represented in the binary system by using "1" and "0" only. Electronic elements have inherent on-off characteristics which are readily adapted to expressing these two values, and the condition of such elements may be changed very rapidly from on to off state and vice versa in calculating operations. However, the advantage gained by rapid calculation in the binary system has been somewhat offset by the equipment and time necessary to translate between the binary and decimal systems for the purposes of entering decimal values into the machine and reading decimal values out of the machine.

The present invention is directed to the provision of a machine for the translation of binary values to decimal values, wherein a higher rate of operating speed is obtained and wherein the indicating value capacity is enhanced over that of conventional machines with a marked reduction in the number of parts required to produce the results desired. Among the foremost objects of my invention are the following: the provision of a novel modified-binary, or "split-binary" system, whereby the indicating capacity of a machine of given size is greatly increased; the provision of conversion means for the changing of an input value in conventional-binary system notation to an equivalent value in my split-binary system notation; the provision of novel accumulator or counter means to receive and store a converted binary notation; the provision of a novel decimal indicating system or means adapted to be related to the counter means to denote the decimal value equivalent of the binary value stored in the counter means; and the provision of novel sensing means intermediate the counter means and indicator means to correlate the value indicated by the position of the latter to the value indicated by the condition of the former. Other objects and advantages of the invention will be clear from the description and operation of the translating machine, hereinafter set forth.

In my Patent No. 2,666,911, granted January 19, 1954, there is described and claimed a code translating device or machine utilizing the stroboscopic principle for indication. This machine comprises a drum rotatable at a high rate of speed and carrying a data or information portion and an associated address portion having a pattern of electrical contacts, each unit of data being related to a particular combination of pattern contacts. Contact sensing fingers are associated with an external group of electrical elements such as a keyboard or a group of relays, so as to indicate the condition of these elements. When coincidence occurs between the particular combination of pattern contacts corresponding to the drum data desired and the condition of the external elements, the sensing fingers cause the stroboscopic light to be energized, thereby visually arresting the drum at the position where the desired data is displayed.

This arrangement makes for an extremely simple and rapid method of translation and indication, and it is this basic arrangement or its equivalent, modified to achieve the above-recited principal objects of the present invention which constitutes the subject translation machine.

SPLIT-BINARY SYSTEM

In preface to a detailed decription of the translation machine embodying the present invention, the following is a brief discussion of the split-binary system, and the advantages to be derived therefrom.

Binary values may be treated as code values, with each combination thereof representing a particular decimal equivalance, so that as the number of binary orders is increased, the number of possible combinations representing equivalent decimal values is increased. For example, three binary orders are capable of representing the first eight decimal values, and each additional binary order doubles the number of decimal values which may be represented.

Since each decimal value is represented by a different combination of 1's and 0's, it is possible, in accordance with my aforementioned Patent No. 2,666,911, to associate such combinations, or "words," with respective portions of an indicator drum so that an equivalent decimal value represented by each selected binary word will be indicated by a stroboscopic light as the drum is rotated. However, since each binary word must be associated with a portion of the indicator drum, a drum of an impractical size would have to be used to indicate a decimal value of any large magnitude. For example, to indicate any decimal value up to 1,000,000 would require a drum of such size as to peripherally accommodate one million separate words, while perhaps a drum having a thousand words would be within practical size limits. However, through use of the split-binary system it is possible to use two indicator drums in side by side relation, each being of a size sufficient to accommodate decimal values from 0 to 999 only, and yet have the two drums together indicate decimal values of 999,999. Each drum is associated with a separate stroboscopic light, with one drum being adapted to indicate the first three decimal orders and the other adapted to indicate the fourth through the sixth decimal orders. Since the drums can be read simultaneously under the independent operation of the two stroboscopic lights, together they are capable of indicating decimal values up to and including 999,999. In like manner, each drum and light added multiplies the decimal value indicating capacity by 1,000.

The additional indicating capacity within practical drum size limits is made possible through the use of the split-binary system as follows: According to the conventional binary system, the decimal equivalent of the tenth order is 512, the eleventh 1024, the twelfth 2048, and so on, and each decimal word of an order above the tenth order consists of a thousands digit as well as digits in the lower decimal orders. By arbitrarily designating the three lowest decimal order digits as 0 and considering the eleventh binary order as having a decimal value of an even 1000, the twelfth order 2000, the thirteenth order 4000, and so on, the eleventh through the twentieth binary orders can be related to a drum having an indicating range of 1,000 to 999,000.

When the decimal equivalent of the eleventh binary order is reduced from 1024 to 1000 the excess 24 must be accounted for; therefore it is added, in binary representation, into the appropriate ones of the ten lowest binary orders. Similarly, the excess decimal value (which is always a multiple of 24) is added into the ten lowest binary orders for each value registered in the twelfth through the twentieth binary orders.

A special case arises where an initial value between and including 1000 to 1023 is entered into a split-binary register. The conventional-binary representations of these values are expressed in the ten lowest orders, but the split-binary representation include a digit 1 in the eleventh order. Ordinarily, the necessity for an addback operation can be detected by initial entry of a conventional-binary digit 1 in the eleventh or higher order, but in the above cases, it must be detected by sensing a combination representing a value greater than 999 in the ten lowest orders. This may be done in any of several ways, e. g., by electrical sensing or by offsetting the decimal value indicating drum with respect to the sensing means or pattern which positionally associates the counters with the indicating drums, so that the indicator drums begin their operation at a setting of 25 (1 plus the 24 addback) instead of 1.

Use of the split-binary system facilitates the translation of binary values even though no novel indicator means, such as the multiple drum arrangement, is used. For example, a binary counter of twenty orders in which the binary equivalent of the decimal word 12280 is registered would stand as follows when the conventional-binary system is used:

ORDER NO.

| 20 | 19 | 18 | 17 | 16 | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|---|---|---|
| 0 | 0 | 0 | 0 | 0 | 0 | 1 | 0 | 1 | 1 | 1 | 1 | 1 | 1 | 1 | 1 | 0 | 0 | 0 |   |

Translating the above from a binary-decimal table:

| Decimal Value | Order No. |
|---|---|
| 8 | 4 |
| 16 | 5 |
| 32 | 6 |
| 64 | 7 |
| 128 | 8 |
| 256 | 9 |
| 512 | 10 |
| 1024 | 11 |
| 2048 | 12 |
| 8192 | 14 |
| Total.. 12280 | |

The same decimal word 12,280 would be registered as follows in a binary counter modified in accordance with the split-binary system:

ORDER NO.

| 10 | 9 | 8 | 7 | 6 | 5 | 4 | 3 | 2 | 1 | 10 | 9 | 8 | 7 | 6 | 5 | 4 | 3 | 2 | 1 |
|---|---|---|---|---|---|---|---|---|---|---|---|---|---|---|---|---|---|---|---|
| 0 | 0 | 0 | 0 | 0 | 0 | 1 | 1 | 0 | 0 | 0 | 1 | 0 | 0 | 0 | 1 | 1 | 0 | 0 | 0 |

Translating the above:

| Upper Bank | | Lower Bank | |
|---|---|---|---|
| Decimal Value | Order No. | Decimal Value | Order No. |
| 4 | 3 | 8 | 4 |
| 8 | 4 | 16 | 5 |
| Total.. 12 | | 256 | 9 |
| | | Total.. 280 | |

It will be apparent from the foregoing that an additional advantage is inherent in the split-binary system, viz. that the values of the items to be added in translating are smaller; and this advantage is always realized because no more than ten orders are ever considered as a group, and therefore no item which is to be added has a value greater than 512, regardless of the magnitude of the decimal word represented in the counter.

The simplification of the binary system through provision of the split-binary system also enables the simultaneous translation of each of two groups of ten binary orders, thereby greatly reducing the time required for the overall translation.

The embodiments of the inventions will be described with reference to the accompanying drawings, in which:

Figure 1 is a top view of the translation machine, with the cover removed;

Figure 2 is a front view of the sensing and indicating drum portions of the machine;

Figure 6 is a right side view, partly broken away, of an indicator drum and dial arrangement;

Figure 7 is a view partly in section taken along lines 7—7 Figure 6;

Figure 8 is a planar development of the sensing pattern on the main sensing drum;

Figure 9 is a diagrammatic illustration of the sequential positions of the movable sensing fingers on the sensing pattern;

Figure 9A is a detail view of one of the sensing finger contact strips of Figure 9;

Fig. 10A is a left side view of one of the counter relays embodied in the machine, and the sets of electrical contacts operated thereby;

Figure 10B is a view taken along lines B—B of Figure 10A;

Figure 13:
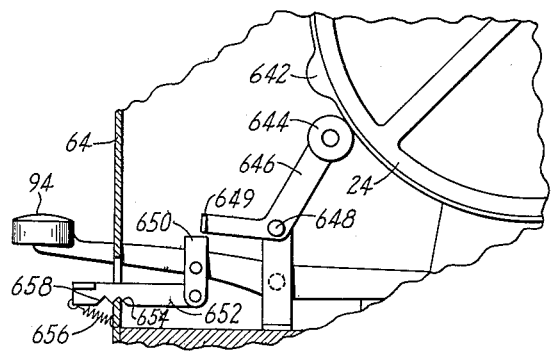
Figure 20:
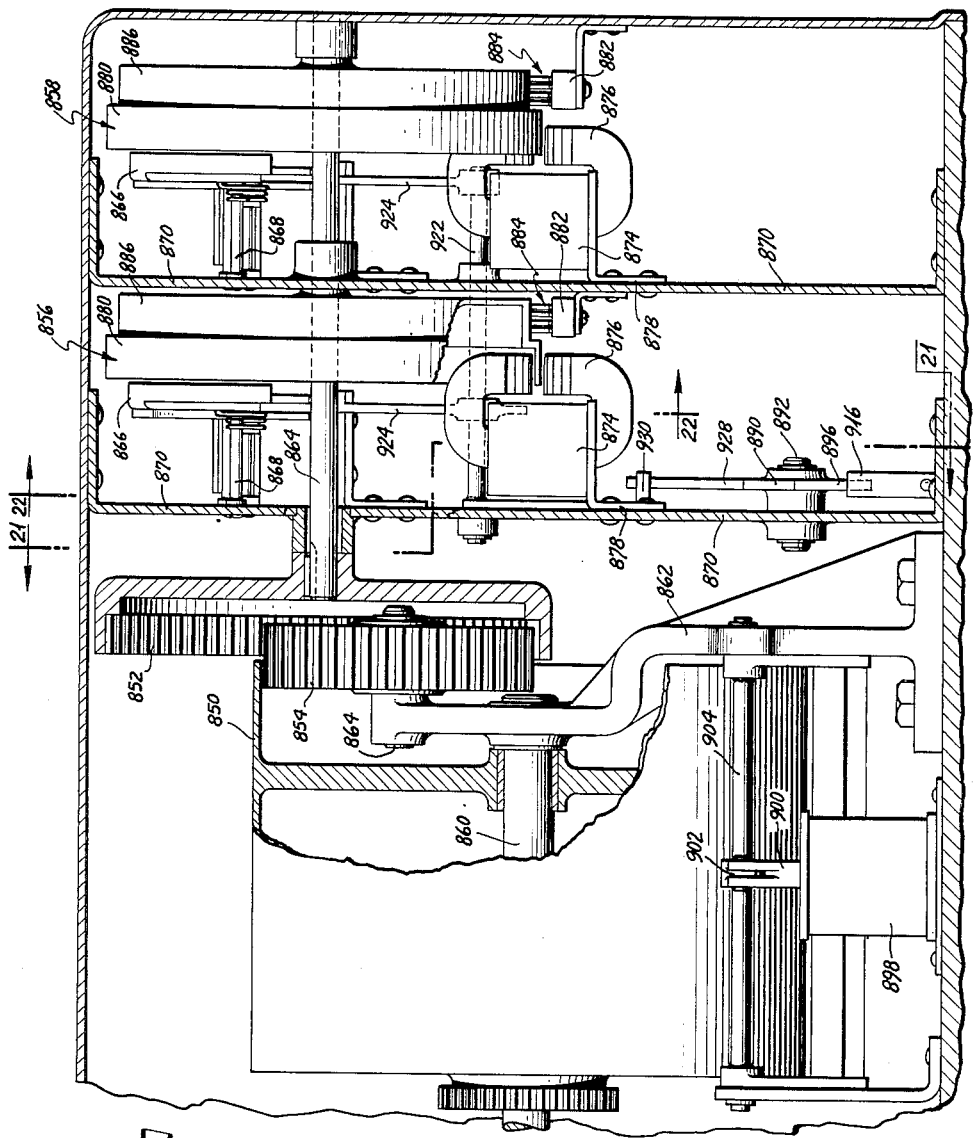

Figures 10C, 10D, and 10E are partial left side views of the relay of Figure 10A, showing the various positions of operation of the armatures of the relay;

Figure 10F is a front view of the contacts of the relay corresponding to the relay condition of 10A;

Figure 10G is a front view of the coil contacts of the relay, showing the position of these contacts when the armatures of the relay are intermediate the positions of Figure 10A and Figure 10C;

Figure 10H is a front view of the relay contacts corresponding to the armature position of Figure 10C;

Figure 10I is a front view of the relay contacts corresponding to the armature position of Figure 10D;

Figure 10J is a view in perspective of a lock member which may be provided for the relay;

Figure 11 is a detailed diagram of the electrical control system for the sensing and indicating phases of operation of the machine;

Figure 12 is a right side view taken along lines 12—12 of Figure 1, showing the transfer drum and control means therefor;

Figure 13 is a detail right side view of a control means adapted to initiate the main sensing operation upon completion of the transfer operation;

Figure 14 is a planar development of the sensing pattern for the transfer drum;

Figures 15A, B and C are sequential wiring diagrams of a relay system for the add-back operation;

Figure 16 is a schematic diagram of the basic electrical system interconnecting the transfer pattern, sensing pattern, and stroboscopic indicator lights;

Figure 17 is a wiring diagram showing the relation between the two relay banks;

Figure 18 is a wiring diagram of an electrical system adapted to receive binary values from an outside counter and transfer them through the transfer pattern to the relay banks;

Figure 19 is a wiring diagram of a modification of the electrical system of Figure 17;

Figure 20 is a front view of the sensing and indicating portions of a modification of the translation device;

Figure 21 is a right side view in section taken along lines 21—21 of Figure 20;

Figure 22 is a right side view in section taken along lines 22—22 of Figure 20; and Figure 23 is a wiring diagram of the electrical control system for the modified form of the device.

FIRST EMBODIMENT

General structure

Referring to Fig. 1, the mechanism forming a connection between the binary value input means and the decimal value output means includes a sensing drum 10 secured by a plurality of web members 12 to a sleeve 14 mounted for rotation on a fixed shaft 16. This shaft is supported by a pair of posts 18 and 20 which are secured to a base member 22. A transfer drum 24 is secured by a plurality of internal web members 25 (Fig. 12) to a sleeve 26 which is also mounted for rotation on the fixed shaft 16. Drive means are provided for the sensing drum 10 and include a gear 28 on sleeve 14, a constantly rotating motor 30 having a gear 32 on its driven shaft, and a pair of gears 34 and 36 forming a driving connection between gear 32 and gear 28, gear 34 being fixed to a stub-shaft 38 rotatably mounted on support posts such as 39 (Fig. 12), and gear 36 being rotatably mounted on a shaft 40 which is carried by an arm 42 of the support post 18. Drive means are also provided for the transfer drum and include a gear 44 secured to sleeve 26, a gear 46 in mesh with gear 44 and rotatably mounted on the support shaft 40, and a gear 48 rotatably mounted on the stub-shaft 38 and connectable thereto for a single rotation by a clutch 50 which is actuated by a key 52. A pair of numeral drums 54 and 56 (see also Fig. 2) are secured to a shaft 58 which is journalled in a pair of bearings 60, each of which is secured to a respective partition member 62. The partition members 62, together with a main casing 64, are supported by the base member 22 and serve not only to enclose the mechanism being presently described, but also to isolate the numeral drums 54 and 56 from each other for a purpose hereinafter described. Means are provided for driving the shaft 58 and hence the numeral drums 54 and 56 at a predetermined speed ratio with respect to the rotation of sensing drum 10, and comprise a gear 66 mounted for rotation on a stub shaft 68 secured to a bracket 70, gear 66 being continuously in mesh with an internal ring gear 71 carried by the sensing drum. Gear 66 is slidable on shaft 68 by a shifting means 72 into meshing engagement with an internal ring gear 74 secured to shaft 58. Separate means are provided for driving shaft 58 and hence the numeral drums 54 and 56 at a one-to-one ratio with the sensing drum 10, and comprise a gear 76 secured to the sleeve 14 and in mesh in a ratio of unity with a gear 78 secured to a shaft 80 which is journalled for rotation in a bearing support sleeve 82. A gear 84, also secured to shaft 80, meshes in a ratio of unity with a gear 86 which is freely mounted on shaft 58. A clutch member 88 is actuated by the shifting means 72 to secure gear 86 to shaft 58 for driving the latter shaft when gear 66 is moved out of engagement with internal ring gear 74 by the shifting means. The clutch member 88 releases gear 86 from fixed relation to shaft 58 when gear 66 is moved into engagement with gear 74 by the shifting means. A sensing finger shifting means is indicated generally at 90, and has a gear 92 carried thereby and driven by gear 84. A key 94 is provided to initiate the sensing operation, as described hereinafter.

Numeral drums and dials

Referring to Figs. 2, 6 and 7, each numeral drum 54 and 56 has around its periphery the consecutive decimal numerals 0–99. Associated with each numeral drum 54 and 56 is a respective dial 100 and 102, each having around its periphery the consecutive decimal numerals 0–9. Each dial assembly includes a shaft 104 journalled for rotation in a bracket 106 (Fig. 7) secured to the casing 64 and in an arm 108 secured to the bracket 106. Fixed to the shaft 104 is a ratchet wheel 110 which in turn has secured thereto the dial shell 112. The ratchet wheel 110 carries a pin 114 which engages one end of a spring 116 coiled about shaft 104. The other end of spring 116 engages a pin 118 carried by arm 108. The tension in spring 116 tends to maintain a stop member 120 on the dial shell 112 in engagement with a pin 122 carried by arm 108. When the dial shell is in the stopped position, the digit 0 thereon underlies a viewing window 96 in the casing 64. A pawl 126 is pivotally mounted on a lever 124 which is freely mounted on shaft 104. A spring 128 urges pawl 126 into engagement with the ratchet wheel 110. Lever arm 124 is pivotally connected to a lever arm 130 having a circlet end 132 sleeved on an eccentric 134 which is secured to shaft 58. Each full rotation of shaft 58 reciprocates lever arm 130 one time, so that pawl 126 moves ratchet wheel 110 one tooth counterclockwise, thereby advancing the dial shell reading by one decimal digit.

Means are provided to center the dial shell and to hold it in full digital position, with respect to the window 96, when pawl 126 is disengaged from ratchet wheel 110 by means hereinafter described. The dial holding means includes a serrated wheel 136 fixed to shaft 104. The periphery of wheel 136 engages a roller 138 carried at one end of a crank arm 140 pivotally mounted at 142 on bracket 106. The other end of crank arm 140 has connected thereto a spring 144 which is secured to an arm 146 carried by bracket 106, spring 144 being effective to urge the roller 138 into holding engagement with the serrated wheel 136. Thus, as each dial 100 and 102 is turned an increment for each revolution of shaft 58, it is held and centered in its new position by the related roller 138.

Each of the numeral drums 54 and 56 is provided with a toothed rim 148. A dog 150, having a tip 152 engageable with the teeth of rim 148, is pivotally supported by an arm 154 which is sleeved on shaft 58. Dogs 150 are provided to control the stroboscopic indication of a decimal value on the numeral drums and dials, as follows. The dog 150 for each numeral drum is provided with a leaf spring 158 which is secured at one end to the pin forming the pivotal connection between the arm 154 and dog 150, and which has its free end in pressing engagement with a smooth peripheral surface 160 of the related numeral drum 54 or 56. A pin 156 mounted on dog 150 serves as a fulcrum against which spring 158 presses to maintain the tip 152 of dog 150 in engagement with the toothed rim 148 of the numeral drum, during display, so that arm 154 rotates with the numeral drum.

Each arm 154 is provided with an ear 166 adapted, during display when the arm 154 is carried for rotation with the numeral drum, to close a pair of electrical contacts 168 (Fig. 7), once during each rotation of the drum, by engagement with a cam lug 170 carried by one of the contacts, to thereby energize a related stroboscopic display light 172 or 174 (Fig. 2). Each light 172 and 174 is under the control of its related drum 54 and 56, respectively, so that the lights are usually energized at different cyclic times. But the time interval between the flashes of the lights is so small, due to the speed of rotation of the numeral drums, that the selected indicia on both of the numeral drums are stroboscopically arrested at the same time, as far as visual reaction is concerned, and the indicated decimal value is read by a single reading of the values in the window 96 related to drums 54, and a similar, aligned, window 98 related to drum 56.

In connection with the viewing of values through windows 96 and 98, it is contemplated that phosphorescent screens or the like may be provided for these windows, and that the numeral drums and dials be provided with either translucent numerals in an opaque field, or opaque numerals in a translucent field, which arrangement, in conjunction with the placing of the stroboscopic lights inside the numeral drums will cause a displayed value to persist on the phosphorescent screens and thereby eliminate any tendency of the viewed value to flicker at lower rotational speeds of the numeral drums.

At the start of the sensing operation, hereinafter more fully described, each of a pair of magnets 176 and 178, associated, respectively, with drums 54 and 56, is energized to bring a related arm 180 into contact with the magnet face 182. The movement of arm 180 causes an upright arm 184, which is connected to arm 180, to be rocked clockwise against the action of a spring 186, thereby bringing an ear 188 of the arm 184 into the path of a trigger member 164 on the related dog 150. Therefore, during the next rotation of drums 54 and 56, both dogs are rocked, bringing the tips 152 thereof out of engagement with the toothed rims 148 of the drums 54 and 56, and arresting the rotational movement of the arms 154. As this occurs the dials 100 and 102 are positioned to read zero, and as the sensing operation proceeds, dials 100 and 102 are advanced one unit for each rotation of shaft 58, until the correct decimal values are reached, as determined by sensing means hereinafter described. When the correct values are reached, magnets 176 and 178 are separately de-energized to allow a respective spring 186 to pivot each arm 184 and bring the ear 188 thereof out of engagement with the trigger member 164 of the related dog 150. As this occurs, the dogs 150, under the action of springs 158, are pivoted to bring their tips 152 into engagement with the teeth of the rims 148, thereby securing the arms 154 to their respective drums 54 and 56 for rotation therewith. Each of the tips 152 is then in engagement with a particular tooth of its rim 148, and the tooth is positionally correlated with the position in which the sensing drum 10 was at the time the correct values were reached, and also with that value on the related numeral drum 54 or 56 which is viewable through the window 96 or 98 when the light 172 or 174 is energized by a closing of the related pair of contacts 168. Each of the lights 172 and 174 is therefore under the sole control of its respective numeral drum 54 or 56 and arm 154, so that when each numeral drum reaches the proper rotational position for closing its contacts 168, the corresponding light is energized separately. The repeated flashing of the lights 172 and 174 makes a single decimal word stroboscopically viewable through the windows 96 and 98, and this word is made up of the combined readings of dial 100, drum 54, dial 102 and drum 56, and is the decimal equivalent of the binary word sensed by the sensing means, as explained hereinafter.

Means are provided to disable each of the pawls 126 (Fig. 6) for preventing further rotation of the dials 100 and 102 after the dogs 150 have become engaged with the rims 148, thereby indicating that the proper decimal value for each of the dials and drums has been reached. The disabling means comprises a respective solenoid 190 for each pawl 126. Each solenoid 190 is energized during the sensing operation proper, but is de-energized upon the locating of the proper decimal value for the related drum 54 or 56. De-energization of a solenoid 190 permits a spring 192 to rock an arm 194 clockwise to thereby pivot the related pawl 126 out of operating engagement with its ratchet wheel 110 for preserving the reading of the related dial 100 or 102 when the sensing has been completed.

Means are provided for restoring the dials 100 and 102 to zero readings in response to the initiation of each sensing operation. Actuation of a key 94 (Fig. 1), constituting the operating key for the mechanism and hereinafter more fully described, causes energization of a respective solenoid 196 (Fig. 6), associated with each numeral drum, to rock crank arms 140 clockwise, thereby disengaging rollers 138 from the serrated wheels 136, thus allowing springs 116 (Fig. 7) to restore dials 100 and 102 to their zero positions, with stop members 120 in engagement with pins 122. Following this operation, solenoids 190 are energized to restore pawls 126 to their operative positions, while magnets 176 and 178 (Fig. 2) are energized to bring the tips 152 of dogs 150 out of engagement with the toothed rims 148 of the numeral drums. The decimal indicator mechanism is then in readiness for the next sensing operation. A more precise description of the sequence of operation of the magnets 176 and 178 and the solenoids 190 and 196 will hereinafter appear in relation to description of the operation of the key 94 and the electrical control circuits which include these elements.

It is to be noted that each set of contacts 168 (Figs. 2 and 7), there being one set for each of the lights 172 and 174, is mounted on a respective block 198 which is adjustably mounted by a plurality of screws 200 on a bracket 202 secured to a partition 62 or to the casing 64. The adjustable mounting of the contacts 168 enables a setting thereof to adjust the timing of the flash of lights 172 and 174.

*Sensing finger drive means*

Figure 3:
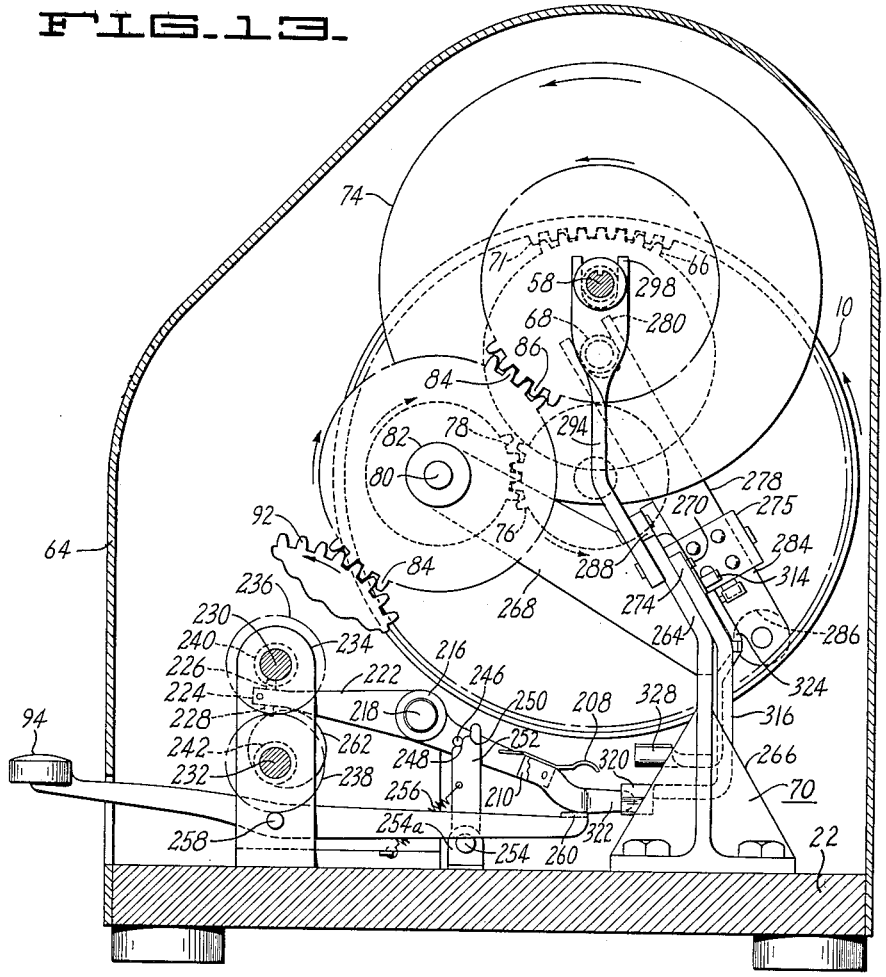
Figure 3 is a right side view in section taken along lines 3—3 of Figure 2.

The sensing pattern of the sensing drum 10 will be hereinafter fully described, but for the purpose of further describing the translating mechanism it is here pointed out that two distinct sets of sensing fingers are provided, one set comprising a plurality of fixed fingers 204 (Fig. 2), carried by a block 206 and adapted to sense one portion of the pattern on drum 10, and another set comprising a plurality of fingers 208 (Figs. 2 and 3) shiftable with respect to the sensing drum to sequentially sense spirally arranged elements of a second portion of the pattern. The fingers 208 are carried by a block 210 secured between two arms 212 and 214 extending from a slide member 216 sleeved for rocking and sliding movement on a shaft 218, the shaft 218 being supported by bracket 220 which is secured to the base member 22. Arm 212 has an extension 222 (Fig. 3) carrying a block 224 provided with a pair of oppositely directed pins 226 and 228, and the block 224 extends between a pair of vertically spaced shafts 230 and 232, each of which is supported for rotation by a common bracket 234 secured to the base member 22. Shaft 230 has secured thereto the gear 92 (Figs. 1, 2 and 3) and a gear 236, and shaft 232 has secured thereto a gear 238 in mesh with gear 236. The shafts 230 and 232 are rotated once for each rotation of drum 10, but in opposite directions, through gear 76 (Fig. 1), gear 78, shaft 80, gear 84, gear 92 (Figs. 1, 2 and 3), and gears 236 and 238. Each shaft 230 and 232 is provided with a respective worm 240 and 242, worm 240 terminating in a ring channel 244. A shaft 246 (Fig. 3) carried between arms 212 and 214 cooperates with a pair of detents 248 and 250 in the end of a latch finger 252 which is pivotally supported at 254 by bracket 254a. Latch finger 252 is urged counterclockwise, as shown in Fig. 3, by a spring 256 which is secured to the base of bracket 234. The operating key 94 has a pivotal connection 258 with bracket 234 and has an ear 260, on the inner arm of the key lever, in abutting relation with arm 212. When arm 212 is in the position shown in Figs. 2 and 3, the fingers 208 are out of engagement with the drum 10 and pin 226 is located within the ring channel 244 of worm 240, member 216 thus being maintained against sliding movement and the arm 212 carried thereby being held in this idling or non-sensing position by the engagement of detent 248 with shaft 246. When it is desired to initiate a sensing operation, the operating key 94 is depressed to rock arm 212 in a counterclockwise direction and bring pin 228 into engagement with worm 242 of shaft 232, fingers 208 into engagement with the sensing drum 10, and shaft 246 into locking engagement with the higher detent 250 of finger 252. The shaft 232, which with the shaft 230 is continuously rotating at the same speed of rotation as drum 10, while the motor 30 is in operation, causes member 216 and arms 212 and 214 carried thereby to be moved along worm 242, thereby causing fingers 208 to scan the drum in a sensing operation, and this movement obtains for eight rotations of the drum 10, for reasons explained hereinafter. When eight rotations of the drum 10 have been completed, block 224 is urged upwardly by a cam 262 which is carried by shaft 232. This forces shaft 246 into holding engagement with the lower detent 248 and brings pin 226 into engagement with worm 240 of shaft 230. Since shaft 230 rotates in a direction opposite to that of shaft 232, the fingers 208, now out of engagement with the drum after completion of the sensing operation, are moved back to their starting position to bring pin 226 into engagement with ring channel 244 of worm 240. The fingers 208 are then in position for a next sensing operation, which may be initiated by another depression of the operating key 94.

*Numeral drum drive selection means*

For reasons hereinafter described, it is desirable, during each sensing operation, to rotate shaft 58 and its numeral drums 54 and 56 at a speed ratio of 128/100 with respect to rotation of the sensing drum 10. It is further desirable, at the end of each sensing operation and in preparation for the next, to rotate shaft 58 at the same speed as drum 10. Accordingly, the ring gear 71 (Figs. 1 and 2) of the sensing drum, has 128 teeth, while gear 74 on shaft 58 has 100 teeth. Therefore, since gear 71 drives gear 74 through the intermediate gear 66 during each sensing operation, shaft 58 rotates at the desired speed ratio 128/100 with respect to drum 10. The alternate gear train for driving shaft 58 at the same speed as drum 10, and comprising gears 76 and 78 (Fig. 1), shaft 80, and gears 84 and 86, has been described previously. The following means are provided for changing the speed ratio of the sensing drum and the numeral drums from 128/100 to unity. Specifically, means are provided, under the control of arm 212 (Figs. 2, 3 and 4) at the beginning of a sensing operation, to bring gear 66 into rapid and positive engagement with gear 74 and to simultaneously disconnect gear 86 from its driving connection with shaft 58, and to later reverse this action at the end of the sensing operation by disengaging gear 66 from gear 74 and connecting gear 86 to shaft 58.

Figure 4:
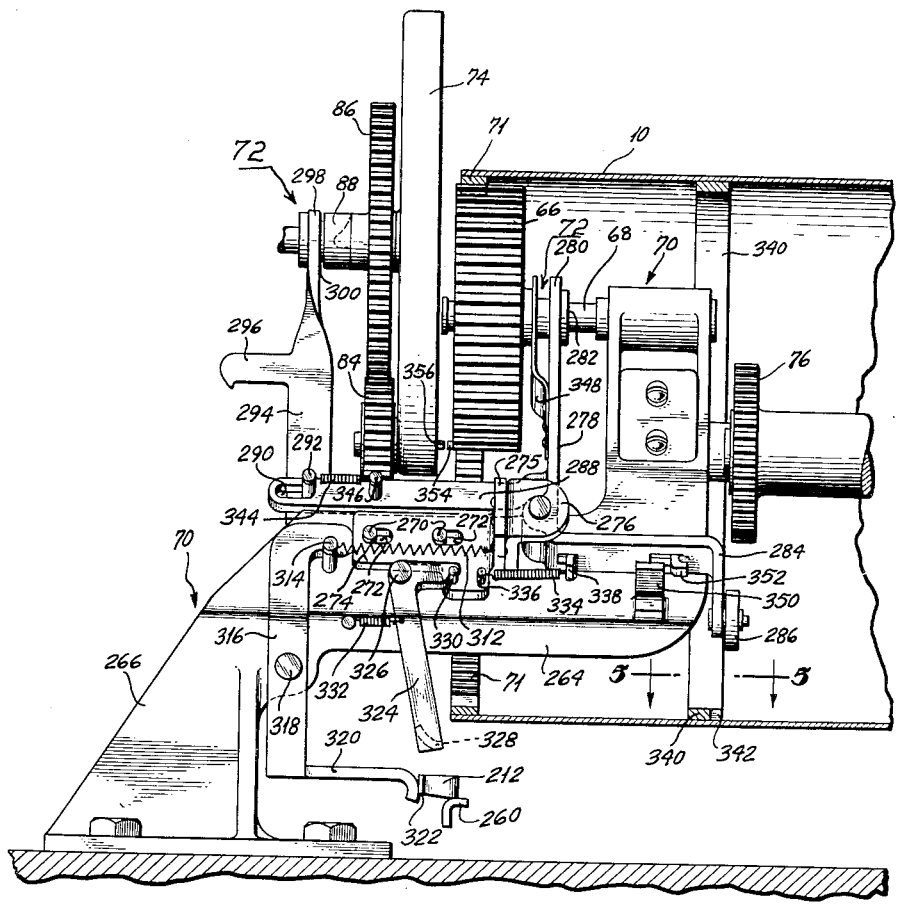
Figure 4 is a rear view of the gear change mechanism interconnecting the sensing and indicator drums.
Figure 5:
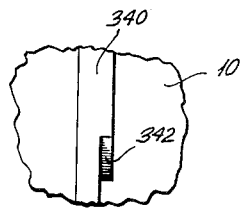
Figure 5 is a detail view taken along lines 5—5 of Figure 4.

Bracket 70, herefore described as supporting stub shaft 68 (Figs. 1 and 2) will be seen in the right side view of Fig. 3 and the rear view of Fig. 4 as having a horizontal arm 264 extending into the drum 10, and a vertical base portion 266 secured to the base member 22, the arm 264 being inclined towards the axis of drum 10 to form an inclined plane surface. The bracket 70 is further provided with arms 268 (Figs. 2 and 3) for the support of bearing sleeve 82. The arm 264 of the bracket is provided with a pair of spaced aligned pins 270 (Figs. 3 and 4), each of which engages a respective slot 272 in a plate 274 to support the latter for sliding movement. The plate 274 has a right angle elbow 275 to which there is secured a U-shaped mounting bracket 276 having pivotally secured between the side portions thereof a crank lever 278 (Figs. 2, 3 and 4), the upper arm of which terminates in a yoke 280 fitting around the stub shaft 68 and in engagement with a collar 282 carried by said shaft. A flat spring 348 is secured to the upper arm of lever 278 and engages the hub of gear 66, thereby maintaining that gear in spaced relation to yoke 280. The lower arm of crank lever 278 terminates in a downwardly directed arm 284 carrying a roller 286 adapted to travel on the inner surface of drum 10. A spring 334 connects a pin 336, which is carried by plate 274, to an ear 338 on crank lever 278, and tends to rock lever 278 clockwise to maintain roller 286 in pressing engagement with drum 10. A stop member 350 on bracket 70 cooperates with an ear 352 on the lower arm of lever 278 to limit the leftward movement of that lever when plate 274 moves leftward. A ring 340 is secured to the inner surface of drum 10, and is provided with a cam rise 342 (shown in detail in Fig. 5) which cooperates with roller 286 to rock lever 278 counterclockwise against spring 334.

A link 288 is pivotally secured at one end to the upper arm of crank lever 278 and is provided with a slot 290 at its other end for receiving a pin 292 which is secured to a lever 294 pivotally connected to the bracket 70. A spring 344 connects pin 292 to a pin 346 carried by link 288, and tends to maintain parallelism between lever 294 and the upper arm of lever 278. Lever 294 is provided with a laterally extending arm 296 and is further provided at its upper end with a yoke 298 fitting within a channel 300 of a first latch member 88, which is in turn secured to shaft 58 for rotation therewith by a key slidable in a keyway 302 (Fig. 2). The clutch member 88 is provided with a notch 304, one side of which has a cammed surface 306. The hub 308 of gear 86, which is sleeved on shaft 58, has an ear 310 complementary to the notch 304 and forming a second clutch member.

A spring 312 (Fig. 4) interconnects the elbow 275 of plate 274 to a pin 314 carried by arm 264 of bracket 70. Spring 312 urges plate 274 to the left, as viewed in Fig. 4, into engagement with a lever 316 which has a pivot connection 318 with bracket 70. The lever 316 is provided with an arm 320 which abuts the foot 322 of arm 212 when the pin 226 (Figs. 2 and 3) is within the ring channel 244 of shaft 230, the foot 322 (Fig. 4) thereby holding the lever 316 in position against the action of spring 312. Another crank lever 324, pivoted to bracket 70 at 326, has a lower arm 328 in the path of travel of the foot 322 of arm 212 when the latter arm is rocked by the operating key 94 to bring the fingers 208 into engagement with the sensing drum 10. Lever 324 also has a detent in cooperative relation with a locking pin 330 carried by plate 274. A spring 332 secured at one end to bracket 70 and at the other end to lever 324 holds the lever in locking position.

The above-described drive selection mechanism operates in the following manner. Depression of the operating key 94 raises the foot 322 of the arm 212 to release the lever 316 from its holding engagement with plate 274 and to bring the foot 322 into tripping engagement with the arm 328 of lever 324. At the same time, pin 228 is brought into engagement with worm 242 and the sensing fingers 208 begin their movement as previously described. The tripping of lever 324 causes it to be moved counterclockwise (Fig. 4) to release the locking pin 330 from the detent of lever 324 and allow plate 274 to be urged to the left by spring 312, thereby bringing the ear 352 into engagement with stop member 350 and bringing roller 286 into the path of the cam rise 342 of ring 340. This first movement of the plate 274 also causes gear 66 to be moved by lever 278 to a position where an ear 354 of gear 66 is in position to engage an ear 356 of gear 74, for causing proper meshing registration between gears 66 and 74. The cam rise 342 is so positioned that the consequent rocking of lever 278 against the action of spring 334 as the roller 286 rides up on the cam will occur at the time ear 354 engages ear 356. The counterclockwise rocking of lever 278 urges gear 66 into mesh with gear 74 very quickly, and at this particular instant the teeth of these gears are in meshing alignment. Spring 348 is provided for urging gears 66 and 74 into mesh without shock or damage. As roller 286 rides up the cam surface 342, ear 352 is raised out of alignment with stop member 350 and plate 274 is permitted to move farther to the left, thereby bringing roller 286 out of the path of the cam rise 342 and allowing it to ride on the continuous surface of ring 340. Pin 314 acts as a stop member for plate 274. Lever 278 is then maintained in its counterclockwise positon by ear 352 which is in engagement with the upper surface of stop member 350. When plate 274 is moved to the left and lever 278 rocked counterclockwise (as viewed in Fig. 4), link 288 rocks lever 294 counterclockwise to disengage clutch members 88 and 308, thereby disabling the one-to-one drive train between drum 10 and shaft 58. When lever 294 is rocked counterclockwise (as shown in Fig. 4; clockwise as shown in Fig. 2) its arm 296 engages a leaf spring 620 for opening a pair of contacts 358 (Fig. 2) and for closing a pair of contacts 360, the purposes of these contacts being hereinafter described.

When the sensing operation has been completed and the decimal value is stroboscopically displayed, in the manner previously described, drum 10 and shaft 58 are returned to a one-to-one drive ratio so that the zero portion of the pattern on drum 10 and the zero numerals on drums 54 and 56 are properly correlated for the next sensing operation. After block 224 is cammed upwardly by cam 262 (Figs. 2 and 3) to bring pin 226 into engagement with worm 240, and after the arm 212 is moved back towards its starting position, the foot 322 of arm 212 contacts arm 320 of lever 316 to rotate said lever clockwise (as viewed in Fig. 4), and the movement of lever 316 forces plate 274 to the right, out of engagement with pin 314, against the action of spring 312, thereby permitting lever 324 to be set in its locking position with respect to the plate, by spring 332. This return movement of plate 274 allows roller 286 to travel down cam rise 342 and onto drum 10, thus rocking lever 278 clockwise to disengage gear 66 from gear 74, and rocking lever 294 clockwise to bring the clutch members 88 and 308 into engagement for a one-to-one drive ratio between drum 10 and shaft 58. Notch 304 on clutch member 88 bears a fixed angular relation to shaft 58 and the zero numerals on drums 54 and 56; similarly, ear 310 bears a fixed angular relation to the zero portion of the pattern on drum 10. Therefore, since gear 86 is driven at the same speed as drum 10 and receives its takeoff drive from the drum, a proper correlation exists between the sensing drum and the numeral drums for the initiation of a subsequent sensing operation.

*Sensing drum pattern*

It has previously been described how a twenty-order conventional binary word can be split into two groups of ten orders each by adding back 24 into the lower bank of orders each time a carry occurs from the tenth to the eleventh order. It is possible for two such banks of ten orders each to cooperate with a single sensing pattern by employing two separate sets of sensing fingers with the same pattern. One set of fingers is electrically related to the numeral drum 56 and its associated dial 102, which together display values in the three lowest decimal orders, and the other set of fingers is electrically related to the numeral drum 54 and its associated dial 100, which together display values in the 4th, 5th and 6th decimal orders.

Fig. 8 shows a planar development of the sensing pattern which is placed in cylindrical form on the sensing drum 10. The left side of the pattern comprises seven spaced columns 364, 366, 368, 370, 372, 374, and 376, representing, respectively, the binary orders 1, 2, 3, 4, 5, 6, and 7, and each of these columns contains, in aligned fashion, a plurality of rectangular electrical contact elements 378, hereinafter termed "lower order contacts." The contacts 378 are further arranged in horizontal rows, each contact representing a particular decimal value, depending on the column 364-376 in which it is located. In general, a contact in the $n$th binary order represents the decimal value $2^{n-1}$; specifically, contacts in the first seven binary orders represent the respective decimal values 1, 2, 4, 8, 16, 32 and 64. The contacts are so arranged that the total of the decimal values represented by all of the contacts in any of 128 horizontal rows equals one less than the decimal number of that row. For example, there are no contacts in the first row, representing a decimal value of zero, and there is a contact in each of the seven columns 364-376 in the 128th row, the seven contacts representing the total decimal value $1+2+4+8+16+32+64=127$.

Located to the right of the column of lower order contacts is a plurality of spaced strips of electrical contacts, hereinafter called "higher order strips," or "contacts," consisting of four eighth-order strips 380, 382, 384 and 386, two ninth-order strips 388 and 390, one tenth-order strip 392, and one "range" strip 394. These strips are formed of electrical conductor, and they are inclined with respect to the edges of the pattern so as to assume a spiral form when the pattern is on the drum 10 in cylindrical fashion. Fig. 9A shows a single strip, such as 380-394, and illustrates how each strip can be divided into four component strips separated by insulation strips 395, with alternate component strips interconnected by leads such as 397 and 399. The eighth-order strips each represent a decimal value of 128, the ninth-order strips a value of 256, and the tenth-order strip a value of 512. The range strip represents no numerical value, but is provided, as will be described hereinafter, to control the beginning and end of operation of the electrical circuits associated with the movable sensing fingers 208 as the fingers scan the higher order contacts.

A group of four fixed sensing fingers 204 (Fig. 2) contacts each of the seven columns 364-376 continually during each of the aforementioned sensing rotations of the drum 10, and each of the seven groups of fingers comprises two sets 396 and 398 of two fingers each, one set 396 being associated with numeral drum 54 and stroboscope light 172 and the other set 398 being associated with numeral drum 56 and light 174. The movable fingers 208 (Figs. 9 and 9A) also consist of four separate groups, one for each of the eighth, ninth and tenth binary orders and the range, and each group also comprises two sets 400 and 402 of two fingers each, the sets 400 being associated with drum 54 and the sets 402 being associated with drum 56.

The eighth-, ninth- and tenth-order contact strips are so spaced and spirally arranged that a sequential sensing contact is made therewith by the sets 400 and 402 of movable fingers 208 during the eight sensing rotations of the drum 10. Referring to Fig. 9A, the two fingers 400 are spaced to cooperate with alternate components of a strip 380-394, and the two fingers 402 are similarly spaced. Therefore, in order for an electrical contact to be made between the two fingers of sets 400 or 402 of any group, both such fingers must be in contact with the same higher order strip. Fig. 9 shows the positions of the fingers 208 with respect to the higher order strips of the sensing pattern during each of the eight rotation of drum 10, the shift in the finger position being caused by the worm 242 (Fig. 2) as previously described. The spiralling of strips 380-394 has the same pitch as worm 242, so that fingers 208 maintain a fixed relationship to these strips during an entire rotation of drum 10, and then abruptly acquire a new relationship at the beginning of the next rotation. During the first sensing rotation of drum 10, neither of the eighth-order sets 400 and 402 of fingers 208 is fully on the first eighth-order strip 380; instead, one finger of each of the sets is on the insulating portion of the pattern. The ninth-order fingers are on the insulating portion of the pattern between strips 386 and 388; the tenth-order fingers are on the insulating portion of the pattern between strips 390 and 392; and range sets 400 and 402 are on strip 394, thus disabling two subsequently described electrical circuits which include the respective sets 400 and 402. Therefore, none of the groups of fingers for the higher order strips are conductive during the first rotation of drum 10, as illustrated in Fig. 9, while the fingers 204 for the lower order contacts are conductive during each rotation of the drum. Consequently, during the first rotation, only the decimal value from 0-127, corresponding to the first seven binary orders, can be sensed.

As the second sensing rotation of drum 10 begins, the fingers 208, as shown in Fig. 9, have the following positions relative to strips 380-394: both sets 400 and 402 of fingers for the eighth order are on strip 380 and are therefore conductive, while the sets 400 and 402 for the ninth and tenth orders are non-conductive. During the second rotation, therefore, values from 128-255, representing the first seven orders plus the eighth binary order, are sensed, and these values, as is the case during all of the rotations of drum 10, are separately sensed by sets 400 and 402 of the fingers for numeral drums 54 and 56, respectively. If the input binary word to be sensed is equivalent to 255 in the decimal system, an electrical circuit, hereinafter described, will be closed through sets 398 of fixed fingers 204 for each of the first seven orders and set 402 of movable fingers 208 for the eighth order to de-energize magnet 178 (Fig. 2), release the dog 150 which is associated with numeral drum 56, and cause the related contacts 168 to be closed once during each rotation of drum 56 at the time the entire word 255 on dial 102 and drum 56 is in registry with window 98. Thereafter, until another sensing operation is started by depression of key 94, this word is stroboscopically displayed by light 174.

In the foregoing example, light 172 would not be energized, since there is no value to be read on dial 100 and drum 54. However, if the input binary word to be sensed were equivalent to 255,000 in the decimal system, a similar circuit would be closed through sets 396 of fixed fingers 204 for each of the first seven orders and set 400 for the eighth order, to thereby de-energize magnet 176, release the dog 150 which is associated with numeral drum 54, and cause the related contacts 168 to be closed. This would energize light 172 once during each rotation of drum 54 to stroboscopically display the value 255 in registry with window 96, dial 100 being thereafter disabled as previously described.

As the third sensing rotation of drum 10 begins, the fingers 208, as shown in Fig. 9, have the following positions relative to strips 380-392: each set 400 and 402 for the eighth order is partly on strip 380 and partly on strip 382, thus rendering both sets non-conductive; the fingers for the ninth order are on strip 388 and are conductive; and the fingers for the tenth order are still non-conductive. Therefore, values from 256-383, representing the first seven orders in combination with the ninth order, are sensed.

During the fourth rotation, the fingers for the eighth order are on strip 382 and are conductive; the fingers for the ninth order are on strip 388 and are conductive; and the fingers for the tenth order are only partly on strip 392 and are, therefore, non-conductive, so that values of 384-511, representing the first seven orders in combination with the eighth and ninth orders, are sensed.

During the fifth rotation, the first seven orders and the tenth order are sensed, representing a decimal range of 512-639; during the sixth rotation, the first seven orders and the eighth and tenth orders are sensed, representing a decimal range of 640-767; during the seventh rotation, the first seven orders and the ninth and tenth orders are sensed, representing a decimal range of 768-895; and during the eighth rotation, the first seven orders in combination with the eighth, ninth and tenth orders are sensed, representing a decimal range of 896-1023.

It is to be understood that the sensing pattern is placed upon the drum 10 so that the zero horizontal row thereof is contacted by both the fixed fingers 204 and the movable fingers 208 at the beginning of the sensing operation, the fingers 208 when moved into contact with the drum by depression of operating key 94 being in alignment with fingers 204. At the same time, the zero lines of the numeral drums 54 and 56 and the zeros of dials 100 and 102 are in registry with the windows 96 and 98. As previously described, the drums 54 and 56 travel at 128/100 the speed of drum 10 during the sensing operation, and the sensing pattern for drum 10 has 128 horizontal rows; therefore, at any given instant during the sensing operation the fingers 204 and 208 are in sensing contact with some combination of first- to tenth-order contacts, and at the same instant each of the drums 54 and 56, in combination with their respective dials 100 and 102, presents the decimal equivalent of the binary word to its related window 96 or 98.

Sensing circuit

Each of the sets 396, 398, 400 and 402 of sensing fingers is connected to a relay indicated generally at 404 (Fig. 16). The bank of relays numbered 1-10 are connected in series with each other and with the stroboscopic light 174 through a circuit control means indicated generally at 406 while, the bank of relays numbered 11-20 are similarly connected in series with each other and with the stroboscopic light 172 through a circuit control means indicated generally at 408. The relays of bank 1-10 are provided with an input lead 410 and are electrically connectible with pattern contacts of drum 10 through fingers 398 or 402, while the relays of bank 11-20 are provided with an input lead 412 and are electrically connectible with pattern contacts of drum 10 through fingers 396 or 400.

Binary relays

The contacts of each of the relays 404 are so devised, as will hereinafter more clearly appear, as to allow passage of current therethrough to the contacts of the next adjacent relay in the bank in either of two ways, viz: (1) through the drum 10 and the set of sensing fingers connected to the relay and thence to the contacts of the next relay; or (2) directly to the contacts of the next relay, bypassing the drum and sensing fingers. If the relay has been conditioned so as to electrically connect the drum and sensing fingers thereto, this means that the relay indicates a value, or, in other words, that that binary order associated with the relay is storing, or registering a value of 1, while if the relay has been conditioned so as to electrically connect the next adjacent relay directly thereto, this means that the relay indicates no value, or, in other words, that the binary order associated with the relay is storing, or registering a value of 0. Each relay is so devised that each input pulse reverses its condition from 0 to 1 or vice versa, and through this provision it is possible to accumulate binary words in the relays, or to add binary words so that the cumulative result represents the binary word which is to be translated during the sensing operation. The relays hereinafter described are disclosed and claimed in the copending application Serial No. 467,517, filed November 8, 1954, which application is a division of the present application.

Reference is made to Figs. 10A-10I for more specific details of the relays 404 and the contacts actuated thereby, and for an illustration of sequential positions of operation of both the relays and the contacts upon the receipt of successive input pulses by the relays. Each relay 404 comprises a pair of frame members 414 and 416 (Fig. 10A), each terminating in a respective pole face 417 and 418. A housing 420 is secured between members 414 and 416 and encloses a coil 422. Member 414 carries a mounting 424 provided with a shaft 426 serving as the pivotal support for a large, or "main" armature 428 (see also Figs. 10B and 10F) and a small, or "control" armature 430, each of which is spring urged counterclockwise about shaft 426. A multi-layered stack 432 of insulation elements carried by member 414 has embedded therein a pivot support 434 for a latch 436 having a substantially arcuate end 438, latch 436 being spring urged in a counterclockwise direction about its pivot. The control armature 430 has secured thereto a finger 440 extending from the forward edge, and an arm 442 extending over the main armature 428 and over latch 436. The main armature 428 has secured to the forward edge thereof a finger 444 serving as a catch for the end 438 of latch 436. The stack 432 has embedded therein four movable leaf spring arms 446, 448, 450, and 452 (Figs. 10A and 10F). Arms 446 and 448 are located above the main armature 428 and have their free ends secured to a tie strip 454 connected to the free end of finger 444, while arm 450, located above small armature 430, has its free end secured to a laterally extending insulating link 456 which in turn is secured to arm 446 for movement therewith. Arms 446, 448 and 450, therefore, move up and down in unison with the main armature 428, and these arms are provided with the respective contacts 460, 462, and 464. Arm 452, located above small armature 430, has its free end secured to a tie strip 466, which in turn is connected to the free end of finger 440. Arm 452, therefore, moves up and down in unison with armature 430, and this arm is provided with a contact 468. The stack 432 has also embedded therein four relatively fixed arms 470, 472, 474 and 476, located above main armature 428, and four similar arms 478, 480, 482 and 484, located above control armature 430. Each of these arms is provided with a contact, as shown in cooperative relation with the contacts carried by the movable arms 446, 448, 450 and 452.

The fixed and movable arms are functionally divided into two separate groups, the lowermost, or "relay control" group, enclosed within a broken outline A (Fig. 10F) and consisting of movable arms 448 and 452 and fixed arms 474, 476, 482 and 484, and the uppermost or "sensing circuit" group, enclosed within a broken outline B and consisting of movable arms 446 and 450 and fixed arms 470, 472, 478 and 480. The arms of group A are electrically connected in the following manner: a lead 483 for each relay 404 is connected through the relay coil 422 to arm 448; arms 476 and 452 are connected in series; arms 474 and 484 are connected in series, and arm 484 is connected to ground by a lead 485 (Fig. 10F); and arm 482 is connected to the lead 483 for the next successive relay in the bank. The arms of group B are electrically connected in the following manner: arms 472 and 480 are each connected in series, by leads 486 (see also Fig. 16), with one of the two related sensing fingers; arms 470 and 478 are connected together in series: arm 450 is connected by lead 410 or lead 412 with the arm 446 of the next adjacent relay in the bank; and arm 446 of the highest order relay of bank 1–10 is connected to the lead 490, while arm 446 of the highest order relay of bank 11–20 is connected to lead 492.

When the armatures and contacts of a relay are in the positions shown in Figs. 10A and 10F, the relay is in its 0 condition. Current through the group B contacts by-passes the sensing fingers and sensing drum pattern by taking the following path: from the next lower order relay through lead 410 or 412, arms 450, 478, 470, and 446 and lead 410 or 412 to the next succeeding relay, and so on, through lead 490 and 492, to the circuit control means 406 or 408. When a pulse energizes coil 422 through lead 483, armatures 428 and 430 are brought into engagement with their respective pole faces. This action causes the armature fingers 440 and 444 to pull tie strips 454 and 466 downwardly, thereby bringing the contacts carried by the movable arms into the positions shown in Fig. 10H. During this movement, the contacts of group A pass through the intermediate positions shown in Fig. 10G, wherein it will be noted that arm 474, which is more flexible than the other relatively fixed arms, has followed arm 448 for a portion of the downward movement of the latter to maintain electrical contact therewith, thus maintaining the coil circuit connected to ground 485 through lead 483 and arms 448, 474, and 484.

The armatures 428 and 430 remain in engagement with the pole faces 417 and 418 for the duration of the input pulse, and at the end of the pulse, both armatures are spring urged away from the pole faces. Due to the fact that latch 436 and armature 428 are pivoted about different centers, the latch end 438, which is in engagement with finger 444 after slight upward movement of armature 428, as shown in Fig. 10D, prevents further upward movement of armature 428, and finger 444 in turn prevents an upward pivotal movement of latch 436, with the result that armature 428 is locked in the position shown in Fig. 10D, while control armature 430 is free to move upwardly to its original position.

The position of the armatures and contacts shown in Figs. 10D and 10I represent the 1 condition of a relay. Arms 472, 476 and 480 are slightly yieldable upwardly to maintain contact with their respective movable arms 446, 448 and 450 upon the limited upward movement of these arms caused by movement of armature 428 from its position shown in Fig. 10C to its position shown in Fig. 10D. When a relay is in the 1 condition, shown in Fig. 10I, a sensing circuit is closed through the group B contacts as follows: from the next lower order relay through lead 410 or 412, arm 450, arm 480, the first lead 486, the related sensing fingers (Fig. 16), the second lead 486, arm 472, arm 446 and lead 410 or 412 to the next preceding relay. The contacts of group A are conditioned, as shown in Fig. 10I, to receive the next pulse and transmit it to the coil of the next higher order relay through the following circuit: from lead 483 of the next lower order, the coil 422, arm 448, arm 476, arm 452, arm 482 and lead 483.

When a value pulse is introduced into a relay which stands in the 1 condition described, the relay is restored to its 0 condition, in accordance with binary addition, and a carry of 1 is entered into the next higher order, as follows. The pulse energizes coil 422 to magnetize the pole face 418, but since armature 428 is both closer to the pole face than control armature 430 and larger than the control armature, it becomes a shunt path for most of the magnetic flux, with the result that the control armature, which was fully restored in the relay's 1 condition, is not drawn into contact with the pole face. The slight downward movement of armature 428 releases latch 436 from engagement with finger 444, and the latch thereupon is moved upwardly by its pivot spring to engage arm 442. At the end of the pulse, armature 428 is spring restored to its position shown in Fig. 10A, and the contacts of groups A and B are restored to their respective 0 positions, as shown in Fig. 10F.

As an auxiliary safeguard to insure against operation of the control armature 430 upon the input of a value pulse to the relay when it is in the 1 condition shown in Fig. 10D, there has been provided a safety lock 487, shown in perspective in Fig. 10J and in operative relation to the relay 404 in Figs. 10A-10E. The lock 487 is provided with a pair of rigidly interconnected arcuate arms 489 and 491, arm 489 being provided at its upper end with a locking notch 493. The lower end of arm 489 is pivotally secured to a stud 494, and spring means, not shown, are provided to urge the lock member 487 in a counterclockwise direction, as viewed in Fig. 10A, to bring the upper end of arm 491 into engagement with the end of armature finger 444. When the relay is energized, finger 444 cams member 487 to the right to allow downward passage of armature fingers 440 and 444. When the armatures are in the positions shown in Fig. 10C, the tips of arms 489 and 491 have moved into overlying relation to the respective fingers 440 and 444. Thereafter, as the control armature 430 moves upwardly to the position shown in Fig. 10D, the member 487 is cammed outwardly by finger 440 until the end of the latter finger snaps into locking notch 493. The engagement of 440 with notch 493 insures against operation of the control armature upon the entry into the relay coil of the next value pulse. It will be noted that the inside face of arm 491 is cut away slightly at 495, in relation to the inside face of arm 489, to prevent outward camming of member 487 during the slight movement of finger 444 from the position shown in Fig. 10D to the position shown in Fig. 10E. Upon the full upward movement of armature 428 at the end of each even-numbered value pulse, finger 444 cams member 487 to the right to allow the armatures to reach their respective 0 positions shown in Fig. 10A.

It will thus be seen that one value pulse latches the main armature of a relay in its 1 position to complete a circuit through the sensing fingers and drum contacts associated with the relay, while a further value pulse unlatches the armature and restores the relay to its 0 condition to complete a circuit directly to the next relay, bypassing the sensing fingers and drum contacts. The twenty relays 404 (Fig. 16) are thus conditioned to set up the binary word which is to be sensed. In other words, the ten relays in each bank, standing in a particular sequence of 1 and 0 settings, constitutes a continuous circuit through the appropriate sensing finger switch contacts. Each combination of 0 and 1 relays in a given bank is matched by a related position of the sensing drum to bridge the switch contacts through the drum contacts, close the circuit, energize the related stroboscopic light, and thus display on the related numeral drum and dial three digits of the translated decimal system word. The relays 404 not only indicate 0 and 1 for each binary order, but they also accumulate the binary words, so that upon conclusion of the input operation, the relay positions represent the cumulative input of binary words. For example, if the first, second, third and fourth relays of group 1–10 were all in the 1 condition and the fifth relay were in the 0 condition, the binary word would be 01111, and the group A contacts of each of the first four relays would be in the positions shown in Fig. 10I, sequential contact being made through the four relays by way of arms 448, 476, 452, and 482. The group A contacts of the fifth relay would be in the positions shown in Fig. 10F, or connected through arms 448, 474 and 484 to ground. A value pulse applied to the first relay would pass through each coil of the first five relays and then be grounded, thus changing each of the first four relays from its 1 condition to its 0 condition and the fifth relay from its 0 condition to its 1 condition, and indicating the new binary word as 10000.

While Fig. 16 illustrates means for translating a conventional-binary word into the equivalent split-binary word, which means will be hereinafter described, it will be understood that if the input is in the split-binary notation, such translation means is not necessary, and that, in such case, it is necessary only to connect the leads 410 and 412 directly to a source of current. The split-binary words may then be entered into the relays by operation of simple switches in coil leads 483, and when all the desired binary words have been accumulated, depression of the operating key 94 initiates the sensing operation and causes the equivalent decimal value to be displayed on the numeral drums and accompanying dials, as heretofore described.

*Addback circuit for interbank carry*

When binary words are entered into the relays 404 (Fig. 16) and accumulated thereby, means must be provided to add back into the lower bank of relays a binary value combination corresponding to the decimal value 24 every time a carry results from the tenth order to the 11th order. This is necessary because, as previously stated, a 1 in the eleventh split-binary order represents the decimal value 1,000 instead of the conventional 1,024.

Figure 15B:
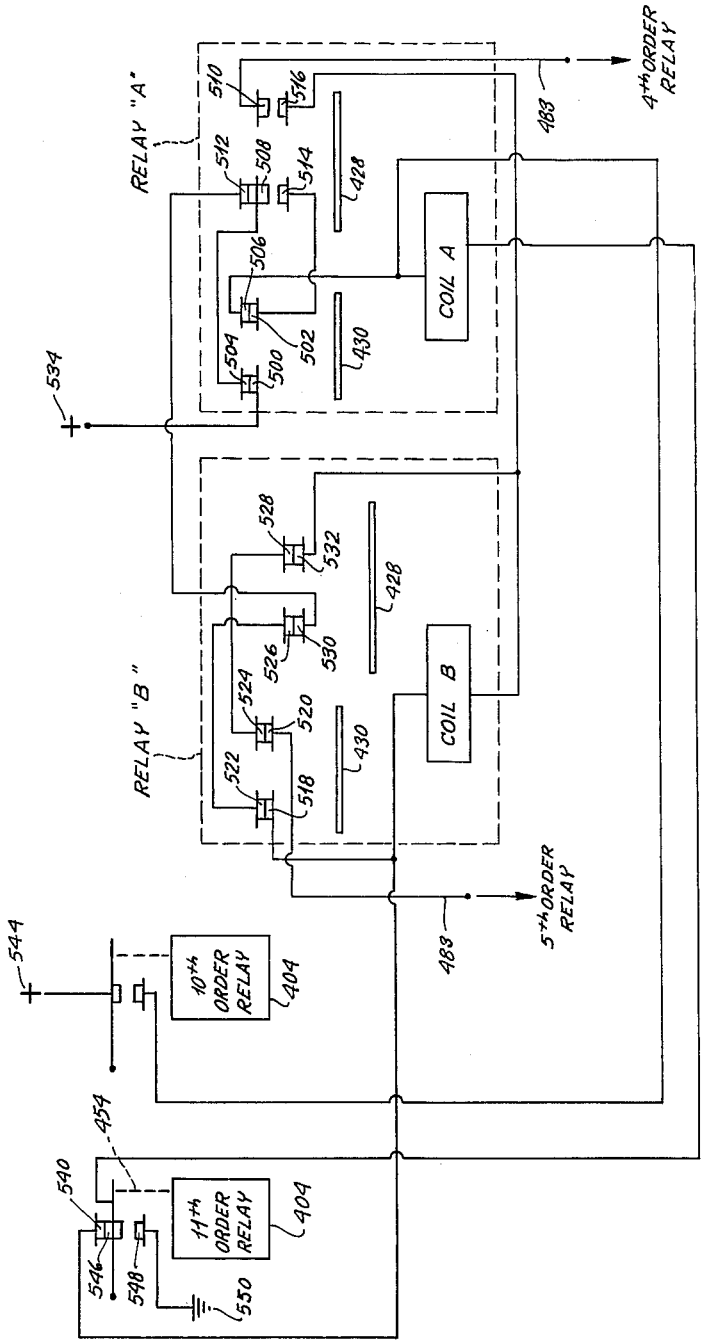
Figure 15D:
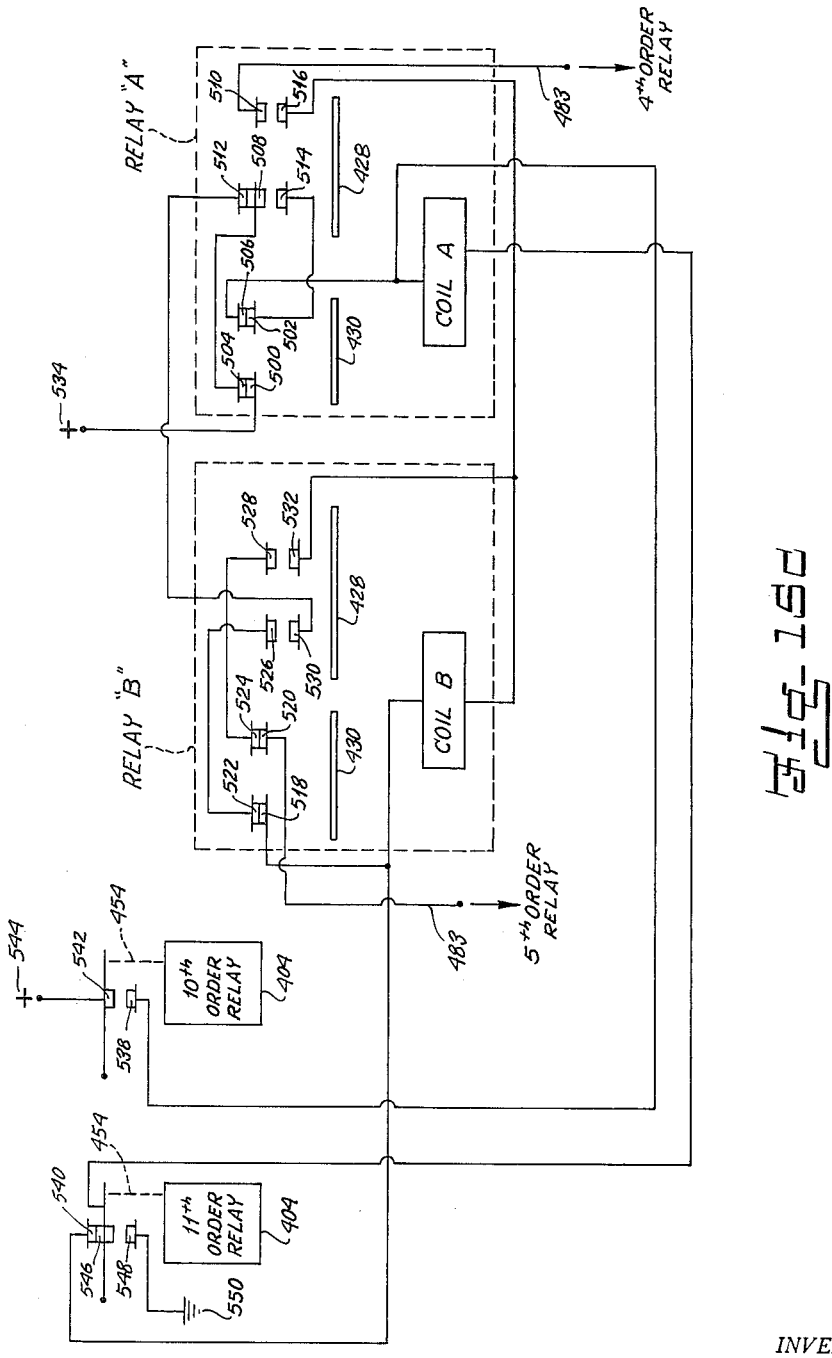

A relay and control system adapted to perform the addback operation are shown in Figs. 15A, 15B, and 15C. In broken outlines A and B there are shown a pair of relays of the type shown in Figs. 10A–10I. These relays are operated separately from relays 404 and are adapted to perform a carry operation from relay A to relay B in the manner previously described. Relay A comprises a coil A, a control armature 430, a main armature 428, a pair of movable contacts 500 and 502, operated by movement of control armature 430, in association with a pair of fixed contacts 504 and 506, and a pair of movable contacts 508 and 510, operated by movement of main armature 428, in association with a plurality of fixed contacts 512, 514 and 516. Relay B comprises a coil B, a control armature 430, a main armature 428, a pair of movable contacts 518 and 520, operated by movement of control armature 430, in association with a pair of fixed contacts 522 and 524, and a pair of movable contacts 526 and 528, operated by movement of main armature 428, in association with a pair of fixed contacts 530 and 532.

The contacts and coils of relays A and B are connected to each other and to relays 404 of the fourth, fifth, tenth and eleventh orders in the following manner: a current source 534 is connected to contact 500; contact 504 to contact 508; contact 502 to contact 514; contact 506 to coil A and to a fixed contact 538 associated with the relay 404 of the tenth order; contact 512 to contact 530; contact 516 to coil B and to contact 532; contact 510 to coil lead 483 for the relay 404 of the fourth order; contact 528 to contact 524; contact 526 to contact 522; contact 520 to coil lead 483 for the relay 404 of the fifth order; and contact 518 to coil B and to a fixed contact 540 associated with the relay 404 of the eleventh order. Relay 404 of the tenth order has associated therewith a movable contact 542, in addition to those shown for the relays 404 in Figs. 10A–10I. Contact 542 is operated by the relay's tie strip 454 and adapted upon movement of the relay's main armature against its pole faces to engage contact 538 and connect a current source 544 to coil A and to contact 506. Relay 404 of the eleventh order has associated therewith a movable contact 546 which is connected to coil A. Contact 546 is operated by the relay's tie strip 454 and adapted, upon movement of the relay's main armature against its pole face, to bring contact 546 out of engagement with contact 540 and into engagement with a contact 548, which latter contact is connected to ground at 550.

The operation of the addback system is as follows: when a carry occurs from the tenth order to the eleventh order, the main armatures of both of the related relays will be against their respective pole faces simultaneously, and this condition closes an independent circuit through relay A to leave it in an operated condition. Before the carry, relays A and B stand in the conditions shown in Fig. 15C. When the carry occurs, contact 542 is moved downwardly into engagement with contact 538, and contact 546 is moved downwardly into engagement with contact 548, thus providing a current to coil A through the following circuit: source 544, contacts 542 and 538, coil A, contacts 546 and 548, and ground 550. Before operation of relay A, the circuit from current source 534 is open at contact 530, and during the operation of relay A, in which both the main armature 428 and the control armature 430 are moved downwardly, the circuit is broken at contact 500. After relay A has operated, however, and its control armature 430 has returned to its raised position (Fig. 15A), the main armature 428 is latched in its down position and relay B is fully restored. The following circuit to the fourth order relay is then completed: source 534, contacts 500, 504, 508, 514, 502, 506, coil A, 546, 540, coil B, contacts 516 and 510, and lead 483. Since a value in the fourth order relay has a decimal equivalent of 8, the pulse to that relay adds back 8 out of the total addback value of 24.

Since the circuit to the fourth order relay is completed through coils A and B, these coils are both energized to cause the following action: relay A having been once operated is restored to its 0 condition in which its armatures 428 and 430 are in their raised positions, and relay B has its armatures 428 and 430 moved downwardly into engagement with their related pole face. When the control armature 430 of relay B is restored and the main armature 428 of relay A is likewise restored, following the described energization of coils A and B, the condition shown in Fig. 15B exists, and the following circuit is completed: from source 534 to contacts 500, 504, 508, 512, 530, 526, 522 and 518, coil B, contacts 532, 528, 524 and 520, and lead 483 to coil 422 of fifth order relay 404. Completion of this circuit, therefore, adds a value to the fifth order relay, which value has a decimal equivalent of 16. The 24 addback is thus accomplished through the fourth and fifth order relays. Completion of this circuit again energizes coil B, for restoring the latter fully to the condition shown in Fig. 15C, when the circuit is broken by the engagement of the main armature 428 of the fifth order relay with its pole face. Relays A and B are thus fully restored in readiness for another addback operation.

*Control system*

The control system will be described with particular reference to Fig. 11, it being understood that the control system therein shown is one of two such systems, there being one for each of the relay banks and its related numeral drum and stroboscopic light.

A current source 560 is connected through the range contact strip 394 (see also Figs. 2, 8 and 9) on drum 10 to lead 410 or 412 (see also Fig. 16), through the conditioned relays 404 to lead 490 or 492, and through an electromagnet 572 to ground. When a binary word is sensed, electromagnet 572 is therefore energized and opens a pair of normally closed contacts 576 located in a lead 578, which lead supplies a holding current from a source 562 to electromagnet 176 or 178 (see also Fig. 2). Upon the opening of contacts 576 and termination of the holding current to electromagnet 176 or 178, armature 180 rises to place a control circuit 585 for light 172 or 174 under control of the contacts 168. When armature 180 rises, thereby rocking arm 184, a pair of contacts 587 are opened, these contacts being located in a lead 588 which supplies a holding current from a source 566 to the electromagnet 190 (see also Fig. 6). The holding current from source 566 to electromagnet 190 is nevertheless maintained through a lead 590 and a pair of contacts 592 which ride in contact with a conducting band 594 located on the inside surface of the related numeral drum 54 or 56. The band 594 has an insulating break 596 located at the zero position of the drum 54 or 56, and thus the holding current to electromagnet 190 is only terminated, following the opening of contacts 587, when contacts 592 reach break 596 in band 594. This insures that the dial 100 or 102 is disabled by de-energization of its pawl-actuating electromagnet 190 only at the end of a rotation of drum 54 or 56, thus allowing the dial to complete its accumulation of the unit count corresponding to the instant rotation of the numeral drum. When electromagnet 190 is de-energized, a pair of contacts 598 in lead 588 are opened to prevent the holding current from being provided to the electromagnet until the latter is again energized. A source 568 provides actuating current for electromagnet 190 through a lead 600 and contacts 360 (see also Fig. 2), and provides actuating current for electromagnet 176 or 178 through a pair of contacts 606 and a lead 604 to ground. Source 568 also supplies actuating current to solenoid 196 through a pair of contacts 610 and a lead 609 to ground. Contacts 606 and 610 are closed upon the depression of the operating key 94 and they are opened when that key is released. A source 570 provides a holding current for solenoid 196 through contacts 358 (see also Fig. 2), a lead 614, a pair of contacts 616, and ground. Contacts 616 are closed when solenoid 196 is energized to restore dial 100 or 102 to its initial position, thereby allowing the holding current to be applied to the solenoid. Each of the foregoing holding currents is of sufficient magnitude to maintain its related solenoid or electromagnet in its energized condition, but is not of sufficient magnitude to initially energize that solenoid or electromagnet.

The sequence of operation of the control system is as follows, beginning with the initiation of a sensing operation by depression of key 94. Fig. 11 shows the control system in the condition wherein a sensed value is being indicated while dial 100 or 102 is disabled and held in its displaying position. To initiate another sensing operation, key 94 is depressed to close contacts 606 and 610 and thereby energize electromagnet 176 or 178, as well as solenoid 196. Operation of electromagnet 176 or 178 arrests dog 150 to prevent light 172 or 174 from flashing, and closes contacts 587 to partially close the holding circuit for electromagnet 190, along lead 588 and up to the open contacts 598. Operation of solenoid 196 restores dial 100 or 102 to its initial position and closes contacts 616 to place the solenoid under control of its holding current through lead 614 from source 570. Operation of key 94 also initiates the previously described gear shift change for the sensing operation, and as this change takes place, contacts 358 (see also Fig. 2) are temporarily opened by movement of arm 296 in engagement with a live tip on spring arm 620, thereby breaking the holding current to solenoid 196. Since key 94 is restored by this time, the holding circuit for solenoid 196 through contacts 610 is also broken, so that centralizer roller 138 returns to its operative position. The movement of arm 296 also closes contacts 360, thereby energizing electromagnet 190 to enable pawl 126 and close contacts 598. This places electromagnet 190 under the control of its holding current through lead 588. Contacts 616 are opened by de-energization of solenoid 196, and electromagnet 176 or 178 is under the control of its holding current from source 562.

The sensing operation having thus begun, continues until the correct binary value is sensed, whereupon electromagnet 572 is energized to break contacts 576 and thereby interrupt the holding current to electromagnet 176 or 178. De-energization of electromagnet 176 or 178 releases dog 150 to open contacts 587, thereby placing the light 172 or 174 under control of its related numeral drum 54 or 56, and causing the holding current for electromagnet 190 to be supplied through lead 590, contacts 592 and drum contact strip 594. When the numeral drum reaches its zero position, contacts 592 reach the break 596 in strip 594 and the holding current to electromagnet 190 is interrupted to de-energize that electromagnet, open contacts 598 and disable pawl 126. The delayed disablement of pawl 126 in this manner permits the incremental movement of the dial 100 or 102 to be completed for the instant rotation of its numeral drum.

The mechanism is now at the end of the sensing operation with the light 172 and/or light 174 flashing, and dial 100 and/or dial 102 disabled. As the gear shift back to a one-to-one drive ratio is thereafter performed, arm 296 moves back to its initial position to bring its tip to the left of the live tip on spring arm 620, and the control system is conditioned for another sensing oepration.

*Conventional-binary to split-binary translation*

A. IN GENERAL

While the mechanism thus far described is adapted to receive a split-binary input word and to translate this word into its equivalent decimal word, there is provided a further translating means, including the transfer drum, a transfer sensing pattern carried thereby, an electrical system associated therewith and with the relays for the sensing pattern, and suitable controls. When a conventional-binary word is entered into this translating means, it is translated into the equivalent split-binary word which is then entered into the two banks of relays 404 associated with the sensing drum 10.

B. TRANSFER DRUM

As previously described, the transfer drum 24 (Fig. 1) is mounted in alignment with sensing drum 10 on sleeve 26 carried for rotation on fixed shaft 16, and is adapted to be selectively driven through the following train: motor 30, gears 32 and 34, stub shaft 38, a one-cycle clutch 50 forming an operable connection between shaft 38 and a gear 48 carried thereby, a gear 46, and a gear 44 on sleeve 26. Referring to Fig. 12, an operating key 52 for the clutch 50 comprises an arm 622 pivotally connected to a bracket support 624 having a base plate 625. A lever 626 is pivotally connected to arm 622 and is urged clockwise by a spring 628, and provided at its upper end with a pawl 630. A crank lever 632 also pivotally carried by bracket 624 is provided at its upper end with a pawl 634 engageable with a recess 636 in clutch 50. The lower end of lever 632 is provided with an ear 638 engageable with pawl 630 of lever 626. A spring 640 urges lever 632 clockwise to normally bring pawl 634 into engagement with clutch 50.

To initiate a transfer operation for converting a conventional-binary word into a split-binary input for the sensing drum 10, key 52 is depressed to move lever 626 downwardly and thereby rock crank lever 632 in a counterclockwise direction to free pawl 634 from recess 636. This permits clutch 50 to operate for connecting gear 48 with shaft 38. The lower end of lever 626 has a cam surface 627 cooperating with the base plate 625 of support 624, and when key 52 is depressed the cam surface 627 engages plate 625 to rock lever 626 counterclockwise. This releases ear 638 from pawl 630 to permit pawl 634 to re-enter recess 636 after the first clutch rotation, even if key 52 remains depressed. When key 52 is subsequently released, a rounded surface on the upper end of lever 626 engages the lower surface of ear 638 and cams lever 626 counterclockwise so that pawl 630 re-engages ear 638. Gear 48, and therefore drum 24, turns one complete rotation before clutch 50 is disengaged, and in this single rotation, the transfer of the conventional-binary word into the equivalent split-binary word is achieved.

Means may be provided, as shown in Fig. 13, to automatically initiate the main sensing operation, hereinbefore described, upon completion of the single rotation of drum 24. The latter drum is provided with a cam lobe 642 adapted, just prior to the completion of a rotation of the drum, to engage a roller 644 carried by a crank lever 646, thereby rocking lever 646 counterclockwise about its pivot 648. An ear 649 on the lower end of lever 646 depresses an arm 650, carried by the arm of operating key 94, to thereby depress key 94 and initiate the sensing operation. Arm 650 has a pivotal connection at its lower end with a lever 652 which is fulcrumed on the machine casing 64 by means of a notch 654. Lever 652 extends through a slot in the casing and is yieldably secured to the casing by a spring 656 which tends to maintain key 94 in its raised position, and serves to return it to this position when the cam lobe 642 has moved out of engagement with roller 644. Lever 652 is provided with a second notch 658, and upon manual movement of lever 652 inwardly of the casing to engage the latter with notch 658, arm 650 is rocked counterclockwise to bring it out of the path of ear 649 of lever 646. In this manner, the above-described mechanism for automatically initiating the sensing operation may be disabled when desired.

C. TRANSFER DRUM SENSING PATTERN

It has been previously pointed out that the split-binary system herein disclosed involves two banks of ten orders each. Whereas the eleventh and twelfth orders of the conventional-binary system have decimal values of 1024 and 2048, respectively, in the split-binary system the corresponding decimal values are 1000 and 2000, and it is therefore necessary to add back 24 into the lower bank of orders each time a thousand in decimal values is indicated in the higher bank. Thus, a value in the eleventh order of the split-binary system requires the adding back of 24, or the introduction of values into both the fourth and fifth orders, corresponding, respectively, to 8 and 16, or a total of 24; a value in the twelfth order, equivalent to 2000 instead of 2048, requires the adding back of 48, or the introduction or values into the fifth and sixth orders, corresponding, respectively, to 16 and 32, or a total of 48; a value in the thirteenth order, representing 4000 instead of 4096, requires the adding back of 96, or the introduction of values into the sixth and seventh orders, corresponding, respectively, to 32 and 64, or a total of 96; and so forth.

The transfer sensing pattern, indicated generally at 660 in Fig. 14, is the conduit whereby the addback sequence is achieved to convert conventional-binary words into equivalent split-binary words. The pattern 660 comprises twenty separate binary order columns 662 and two "border" columns headed by the letters C and D. Each of the twenty columns contains one or more light rectangular contacts 664, representing the order being sensed, and one or more dark rectangular contacts 666, representing the order of the split-binary groups to which current through the drum is directed, i. e., the counter relay 404 to which current is directed.

The drum 24 (Fig. 12) cooperates with a plurality of aligned sensing fingers 668 secured to a block 670 which is carried by a support 672. Fingers 668 are fixed in contacting position with respect to the sensing pattern 660, there being two fingers for each of the twenty columns of the pattern, one for sensing the contacts 664 and one for sensing the contacts 666. Since the fingers 668 are in alignment with each other and since the contacts on the pattern 660 are in staggered relation to each other, the columns are sequentially sensed during rotation of drum 24, there being a single rotation required to complete a translation operation. Each of the twenty fingers 668 for contacts 666 is connected to one or more leads 483, as schematically illustrated in Fig. 16, for the coils 422 of relays 404, while each of the twenty fingers 668 for contacts 664 is connected by a lead 674 to a conventional-binary counter, not shown, which provides a combination of signals corresponding to a conventional-binary value standing in the counter. In the schematic illustration shown in Fig. 16, the pattern of connections between the relays 404 and the leads 483 corresponds to the pattern of contacts shown in Fig. 14.

As an example of a translation operation, assume that the counter which supplies leads 674 stands with a value in only its eighteenth order (equivalent to 131,072 in the decimal system). Referring to Figs. 14 and 16, a signal voltage is fed through the eighteenth-order lead 674 to the finger 668 which is in alignment with contacts 664 in the eighteenth column of pattern 660, there being five contacts 664 in this particular column. During the single rotation of the transfer drum 24, when finger 668 engages the first of these five contacts 664, a pulse is transmitted through the transfer drum to the finger 668 which is at that time in engagement with contact 666 for the eighteenth column. At this instant, no other finger 668 is in engagement with a contact 666; therefore, a pulse appears on only the eighteenth-order lead 483 and is conducted to the coil of the related relay 404, i. e., the eighth relay in the higher bank. A split-binary component value, which is equivalent to a decimal 128,000 is thereby introduced into this relay in accordance with the split-binary system. As drum 24 rotates to bring the eighteenth-order finger 668 into engagement with the second contact 664 in the eighteenth column, a pulse passes through the drum and the contact 666 in the eleventh column to the eleventh relay 404, i. e., the first relay in the higher bank, thereby introducing a split-binary equivalent of a decimal 1000. When the third contact 664 for the eighteenth column is sensed by the related finger 668, contact 666 for the twelfth column provides a pulse to the twelfth relay 404, i. e., the second relay in the higher bank, which has a value with a decimal equivalent of 2000. Similarly, as the eighteenth-order finger 668 senses the fourth and fifth contacts 664, values are entered into the fourth and seventh relays 404, respectively, having equivalent decimal values of 8 and 64. A total decimal equivalent of 131,072 is thus fed into relays 404.

In like manner, regardless of the value of the conventional-binary input word, the pattern 660, during a single rotation of drum 24, will convert the conventional-binary word into the equivalent split-binary word by splitting the input word into its appropriate components and entering these into the related relays 404. A depression of transfer key 52 is therefore effective to cause the described train of operation, beginning with the rotation of drum 24 to convert the conventional-binary input to the split-binary system, and followed by the automatic initiation of the sensing operation to display the equivalent decimal value.

D. INTERBANK CARRY ADDBACK FOR CONVENTIONAL BINARY INPUT

The operation of the 24 addback system which is employed when a split-binary word is entered into relays 404 has been described previously with reference to Figs. 15A, 15B and 15C. When a conventional-binary word is entered into transfer drum 24, not only must this word be split into components of the split-binary system, but means must be also provided to add back 24 into the lower bank of relays 404 for every carry that occurs between the tenth and eleventh orders.

The circuit shown in Figs. 15A, 15B, and 15C is used for this addback operation, and Fig. 17 shows the circuit correlated with the wiring circuit for relays 404. The operation of relays A and B is the same as that described for the addback system of Figs. 15A, 15B and 15C. When a carry occurs between the tenth and eleventh orders, a pulse from source 544 passes through a pair of contacts 704 and 708 and the contacts 542 and 538 to coil A, and back to ground through contacts 546 and 548. Relay A is thus actuated, and when the control armature thereof restores, current from source 534 passes through coil A and coil B, as previously described, and to the fourth order relay to thereby add back a value having a decimal equivalent of 8. Relays A and B are thus operated and upon operation of relay B, a pair of timing contacts 680 connected to the control armature of relay B by means of tie strip 446 (Figs. 10A–10I) are opened to terminate the current through lead 483 to the fourth order. As relays A and B are actuated, both armatures of relay A become fully restored while the main armature of relay B is moved to its operated position. As soon as this condition is assumed by relay B, current from source 534 passes through contacts 500, 504, 508, 512, 530, 526, 522 and 518 and coil B to operate relay B, and through contacts 532, 528, 524, 520 and a pair of timing contacts 682 to the coil of the fifth order relay, thus adding back a value having a decimal equivalent of 16. As the fifth order relay is operated, contacts 682, which are controlled by tie strip 446 of the relay, are broken to terminate the current through that relay. The same pulse of current operates relay B thereby restoring that relay to its unoperated condition.

Interbank carry

The first ten binary orders can accumulate binary words equivalent to decimal values of up to 1023 before causing a normal binary carry to the upper bank and a consequent addback of 24 to the lower bank. It is recalled, however, that in the split-binary system employed in the present invention, the numeral drum 56 and dial 102 associated with the lower bank can display decimal words having values only through 999. Therefore, when a binary word having an equivalent decimal value of 1000 to 1023, inclusive, is accumulated in the lower bank, it is necessary to cause a carry of 1000 to the higher bank and retain the value in excess of 1000 in the lower bank. The means for accomplishing this carry to the upper bank is shown in Fig. 17. Each of the relays A and B is provided with an extra pair of contacts, relay A having contacts 684 and 686 and relay B having contacts 688 and 690. Contact 684 is connected to current source 534, and contact 686 is connected through an electromagnet 692 to ground. Contact 688 is connected to current source 534, and contact 690 is connected through electromagnet 692 to ground. Each of the return leads of relays 404 is connected into a lead 696 which in turn is connected through an electromagnet 698 to ground. Electromagnet 692 has associated therewith contacts 702, 704, 706 and 708, contacts 702 and 704 being carried by an arm 710. Electromagnet 698 has associated therewith contacts 712, 714, 716 and 718, contacts 716 and 718 being carried by an arm 720. Each arm 710 and 720 is movable upon energization of its associated electromagnet to open its related contacts. Contact 702 is connected to contact 716; contact 704 is connected to current source 544; contact 706 is grounded; and contact 708 is connected to contact 542 and to relay 10, and from relay 10 by means of a lead 724 to relays 9, 8, 7, 6 and through a lead 726 to both relays 5 and 4. From either relay 5 or 4, there is a connection through a lead 728 and a lead 730 to contact 714. Therefore, when the relays 10, 9, 8, 7, 6 and either or both relays 5 and 4 are in their value conditions, contact 708 is connected to contact 714.

The foregoing circuit, comprising elements 684—730 in conjunction with addback relays A and B, is operable to cause a carry of 1000 to the higher bank of relays when the lower bank contains a binary word equivalent to a decimal value of 1000 or over, in which case all of the relays 6 to 10, as well as either or both relays 4 and 5, are in their value, or latched conditions. The carry of 1000 to the higher bank of relays may be made by adding 24 to the lower bank, but the addback of 24 which would normally result from a carry from the tenth to the eleventh orders must in that case be disabled. In other words, the adding of 24 through relays 4 and 5 when relays 6 to 10 are latched forces a carry of 1000 to the higher bank, but then to allow this carry to cause an additional addback would result in an error. The addition of 24 to cause the carry is made through the regular addback relays A and B as follows. When relays 6 to 10 and 4 and/or 5 are latched, a circuit is completed from source 544 through contacts 704 and 708, leads 724, 726, 728 and 730, contacts 714 and 718, coil A, contacts 712, 716, 702 and 706 to ground. Energization of coil A operates relay A to close contacts 684 and 686, whereupon current from source 534 passes through these contacts and through electromagnet 692 to ground, thereby operating that electromagnet and breaking contacts 702, 706, 704 and 708 to disconnect current source 544 from relay A, which is then in an operated condition and goes through the sequence previously described for adding 24 to the fourth and fifth order relays.

During this addition of 24, either relay A or relay B is in operated condition; therefore, electromagnet 692 is maintained in an operated condition by a hold current from source 534 through either contacts 688 and 690 or through contacts 684 and 686. Also during the operation of adding 24, the carry of 1000 from the tenth order to the eleventh order occurs, and at this time the main armatures of the tenth and eleventh order relays are in engagement with their related pole faces, thus closing contacts 542 and 538 as well as contacts 546 and 548. But since contacts 704 and 708 are open while electromagnet 692 is held in operated condition, the addback resulting from this carry is disabled, because current source 544 is not connected to relay A. As soon as relays A and B have operated in their previously described sequence, they are restored to their unoperated conditions, and electromagnet 692 is then de-energized.

Means are provided for delaying the 24 addition sequence until completion of the pulse which sets relays 6 to 10 and relay 4 and/or relay 5 to cause that addition sequence. The relay means comprises electromagnet 698 and contacts 714 and 718. Each relay 404 in the two banks has its return circuit connected to lead 696, which in turn is connected through electromagnet 698 to ground 700; therefore, during the operation of any relay 404, electromagnet 698 is energized and contacts 714 and 718 are open. The pulse causing the 1000–1023 condition in the lower bank of relays must therefore be completed before the circuit from source 544 through coil A to ground is completed for initiating the 24 addition sequence.

The clearance of the relays 404 occurs with the depression of an operating key and consists of the closing of a circuit through all of the operated relays directly to ground for supplying a pulse to each operated relay, thereby restoring it to its 0 condition, but not causing the normal carry operation between adjacent relays.

*Alternate means for receiving a word input from a binary counter*

Words standing in a binary counter may be registered in a variety of ways, and the method of transferring such words from the counter to the present translation mechanism will depend on the type of counter used. If the counter comprises ordinal relays, the conditions of which represent ordinal values, then current may be supplied from the counter relays to relays 404 directly through a pair of contacts and the transfer drum. Usually, however, ordinal values are represented in a binary counter by ordinal pairs of tubes, one tube of each pair being in a conducting state to represent a value. The current through such a tube may not be sufficient to operate a relay 404, in which case the tube output may be used to control a grid of another tube which operates as an amplifier for supplying enough current to operate the relay. Fig. 18 illustrates an arrangement whereby the output of a binary counter of the tube-indicating type may be entered into the relays 404 of the present system.

In such case, the transfer drum 24 is divided into two sections 740 and 742 which are electrically separated from each other by insulation 744. Section 740 carries contacts 664 of transfer pattern 660, while the section 742 carries contacts 666 of the transfer pattern. In other words, pattern 660 is divided into two sections, while maintaining the same fundamental orientation of contacts 664 and 666 as shown in Fig. 14. The counter is provided with a pair of tubes for each binary order, each pair consisting of a lower tube 746 and an upper tube 748. The tubes 746 and 748 of each pair are so related to each other and to a particular sensing finger 668A that if the counter contains a value in a particular order, the tube 748 corresponding to that order represents the value by non-conductance, thereby supplying a relatively high voltage through a lead 750 to the finger 668A associated with the tube. A plurality of fingers 668B associated with drum contacts 666 are connected by respective leads 752, corresponding to pulse leads 483 (see Figs. 11, 15–17), to relays 404, and relays 404 are connected by respective leads 754 to a lead 756 which in turn is connected to the anode 758 of a normally nonconducting relay-operating tube 760. A grid 762 of tube 760 is connected by a lead 764, including a resistor 766, to transfer drum section 740. A current source 768 is connected by a lead 770 to drum section 742 and is also connected through a resistor 772 to ground. The cathode 776 of tube 760 is connected to source 768 through resistor 772 and is also connected to grid lead 764 by a lead 778, including a resistor 780.

As previously stated, when a particular counter tube 748 indicates a value by nonconductance, a relatively high voltage is supplied through lead 750 to the sensing finger 668A associated with the tube. Thus, when a particular contact 664 is engaged by its finger 668A during the rotation of the transfer drum, a relatively high voltage is impressed on the grid 762 of the tube 760, causing that tube to conduct. The value of resistor 766 is sufficiently large to limit the current flow from source 768 to a value which will not disturb the counting tube pair. When tube 760 conducts, current from source 768 passes through lead 770 to drum section 742, the particular contact 666 which is being sensed, the related finger 668B, lead 752, relay 404, lead 754, lead 756, and the discharge circuit of tube 760. Thus, if a tube pair contains a value the proper relay 404 is operated.

*Addback delay during normal transfer*

The electrical system of Fig. 17 has been previously described as embodying means, relays A and B, for the addback of 24 upon a carry from the tenth to the eleventh order during the transfer operation. It will be obvious that the speed of operation of the transfer drum 24 can be increased, or the contacts of the transfer pattern 660 can be placed closer together, if means are provided to delay the 24 addback operations until the normal transfer operation is completed, since the time required for the operation of relays A and B during addback sequences need not be taken into consideration. Such delay means constitute a modification of the system of Fig. 17 and are shown in Fig. 19.

During any word entry from an outside binary counter to the two-bank relay counter of the present system, there can occur a maximum of three carries from the tenth to the eleventh orders. Means are therefore provided for disconnecting relay A from current source 544 during the time when these carries may occur, and for connecting that source to another pair of relays C and D which are effective to accumulate the number of carries until transfer drum 24 has had its twenty columns 662 sensed. Thereafter, relays C and D are sensed by sets of contacts on pattern 660 similar to contacts 664 and 666, and if one or more carries from the tenth to the eleventh order have been accumulated, the addback is entered into the appropriate combination of fourth, fifth and sixth order relays through drum 24.

Referring to Fig. 19, current source 544 is connected to a switch contact 800 carried by an arm 802 operated, as shown in Fig. 12, by depression of the transfer key and consequent pivotal movement of lever 632 to initiate the rotation of the transfer drum. Contact 800 engages a contact 804, connected to contact 704 (see also Fig. 17), when the drum 24 is not in operation, and engages a contact 806 when the drum is in operation. Contact 806 is connected to a contact 808 located on the arm which carries contact 542, and cooperates with a contact 810. Contact 810 is connected to the coil of relay C. The main armature of relay C carries with it a pair of movable contacts 812 and 814, contact 812 cooperating alternately with a pair of fixed contacts 816 and 818, and contact 814 cooperating with a contact 820. The control armature of relay C carries with it a movable contact 822 which cooperates alternately with a pair of fixed contacts 824 and 826. Contact 826 is connected to a contact 828 carried by the arm on which contact 546 is carried, contact 828 cooperating with a fixed contact 830, which is grounded. Contact 824 is connected through the coil of relay D to contact 828. Contact 816 is connected to contact 826, and contact 818 is connected to contact 822. Relay D operates a movable contact 832 which cooperates with a fixed contact 834. A current source 836 is connected to contacts 814 and 832, while contacts 820 and 834 are connected, respectively, to a pair of sensing fingers 668C and 668D which are in engagement with the output section 742 of transfer drum 24.

Referring to the transfer sensing pattern 660, as shown in Fig. 14, it will be noted that at the bottom of the pattern and to the left of the twentieth column 662, there are located a plurality of contacts 664C and 664D, while located laterally across from these contacts are a plurality of contacts 666C and 666D. These contacts enable a sensing of relays C and D at the end of a normal transfer operation so that the addback of 24 (and there may be a maximum of three such addbacks resulting from a single transfer operation) may then take place. In connection with Fig. 18, it was pointed out that the transfer pattern contacts 664 and 666 may be grouped on separate drum sections 740 and 742. In order to bypass the electronic sensing and operating means and supply current from source 836 directly through the drum, contacts 664C and 664D, as well as contacts 666C and 666D are located on the output section 742 of drum 24. Finger 668C senses contacts 664C and finger 668D senses contacts 664D, while three fingers 668E, 668F and 668G are provided, respectively, in sensing relation to the fourth order contact of group 666C, the fifth order contacts of both groups 666C and 666D, and the sixth order contact of group 666D. Fingers 668E, 668F and 668G are connected by respective leads 750 to the pulse leads 483 of the fourth, fifth and sixth order relays 404.

During the transfer operation, contact 800 engages contact 806 and upon a carry from the tenth to the eleventh order relay 404, contact 828 engages contact 830 and contact 808 engages contact 810. A pulse from source 544 thereupon takes the following path: contacts 800, 806, 808, 810, coil of relay C, contacts 812, 816, 826, 828, 830 and ground. Relay C is thus operated to latch its main armature, whereupon contact 814 engages 820, contact 812 engages contact 818, and contact 822 engages contact 824. Current source 836 is then connected through contacts 814 and 820 to finger 668C, and finger 668C sequentially engages the two contacts of group 664C at the end of the transfer sensing of the twenty columns 662. Assuming that only one carry from the tenth order to the eleventh order occurred during the transfer operation, a pulse is entered, through the fourth and fifth order contacts of group 666C and fingers 668E and 668F, into the fourth and fifth order relays 404, thereby causing an addback of 24 into the lower bank.

If, while contact 800 engages 806 during the transfer operation, a second carry occurs between the tenth and eleventh order relays 404, another pulse from source 544 serves to operate both relay C and relay D, restoring the former and latching the latter, and this pulse takes the following path: contacts 800, 806, 808, 810, coil G, contacts 812, 818, 822, 824, coil D, contacts 828, 830 and ground. Operation of relay C and relay D serves to open contacts 814 and 820 and close contacts 832 and 834, and if there are only two carries from the tenth to the eleventh order relays during the transfer operation, the following addback operation takes place after the transfer sensing of the first twenty columns. Current source 836 is connected through contacts 832 and 834 to finger 668D, thereby entering pulses into the fifth order contact of group 666D and the sixth order contact of group 666D through contacts 664D and drum section 742. These pulses are transmitted through fingers 668F and 668G to the fifth and sixth order relays 404, respectively, thereby adding decimal equivalents of 16 and 32, or a total of 48, to the lower bank of relays. The addback of 48 is equal to two separate addbacks of 24, and thus the operation of relay D is effective to store two addbacks of 24 until the end of the normal transfer operation.

If a third carry occurs during the transfer operation, another pulse from source 544 serves to again operate relay C, without affecting relay D, and this pulse takes the following path: contacts 800, 806, 808, 810, coil C, contacts 812, 816, 826, 828, 830 and ground. Current from source 836 is thus supplied to both fingers 668C and 668D, and at the end of the transfer operation a pulse is entered into the fourth order relay, two pulses are entered into the fifth order relay, and a pulse is entered into the sixth order relay. Valus of 8, 16, 16 and 32 are thereby added back into the lower bank of relays, and these values total 72, or three addbacks of 24. Thereafter, the relays C and D are in a state of clearance for a subsequent transfer operation.

When the pattern contacts 664C, 664D, 666C and 666D have been sensed, the transfer operation is concluded, and arm 802 is allowed to snap back by movement of lever 632 (Fig. 12), thereby closing contacts 800 and 804. Relays C and D are thus disabled, and relays A and B are enabled to perform their functions of entering 24 into the lower bank in the event that this bank contains a decimal value of 1000 or more. If the latter condition exists at the end of the transfer operation and after relays A and B are enabled, relays A and B operate in the manner previously described, whereupon electromagnet 692 is effective to prevent the further adding back of 24 due to the carry of the 1000 to the upper bank.

SECOND EMBODIMENT

In general

A modified embodiment of the invention as applied to the translation of binary words to equivalent decimal words is shown in Figs. 20 to 23. This modified embodiment is disclosed and claimed in the copending application Serial No. 467,145, filed November 5, 1954, which application is a division of the present application. This embodiment differs from that previously described in that the sensing drum and the numeral drums remain constantly geared together, turning at a ratio of 128/100. This is accomplished in the same manner as in the previous embodiment, namely, the sensing drum 850, as shown in Fig. 20, has one hundred twenty-eight teeth and is connected to a numeral drum drive gear 852, having one hundred teeth, by an intermediate gear 854. Thus, for every rotation of the sensing drum 850, the numeral drums 856 and 858 advance 1.28 rotations. Being connected in this manner, the numeral drums and sensing drum concurrently reach a zero position once every twenty-five rotations of the sensing drums or thirty-two rotations of the numeral drums.

The depression of the operating key conditions the machine for sensing, but the sensing operation does not begin until the sensing and numeral drums attain zero simultaneously. The translation of any binary value is accomplished within the first eight rotations of the sensing drum, as was the case in the first embodiment of the machine. However, the present embodiment employs only the lowest seven orders of the binary system for sensing by the stationary sensing fingers according to the sensing pattern of Fig. 8. The eighth, ninth and tenth binary orders are brought into effect in proper sequence by the operation of separate counter relays instead of by laterally moving sensing fingers, as shown in the first embodiment of the machine. The other differences between the present embodiment and that first set forth are as follows: the dial associated with each numeral drum is operated by an electromagnet adapted to advance the dial one increment for each rotation of the drum until the proper value is obtained, as contrasted with the previously described mechanical operation of the dial by an eccentric mechanism; and each of the stroboscopic lights is under the control of a magnetic spot, as contrasted with the mechanical control arrangement of the first embodiment. These changes greatly simplify the mechanism necessary for the translation and may be adapted for continuous sensing, that is, the initiation of a new sensing operation each time a change occurs in the binary relays within the machine, thus giving apparent continuous indication as calculations are in progress.

Figs. 20–22 show the general construction and relationship of the parts of the machine, it being noted that the structure of Fig. 20 is fairly similar in appearance to, though less complicated than the corresponding structure of the first embodiment. The sensing drum 850 is mounted on a shaft 860 having a bearing support in a frame 862, this frame also supporting a stub-shaft 864 of gear 854 which is in mesh with the numeral drum drive gear 852. Gear 852 and numeral drums 856 and 858 are secured to a shaft 864, while dial segments 866 are mounted on respective shafts 868 supported by frame members 870. The dial segments 866 are operated by respective solenoids 872. A pair of magnetic transducing heads 874 provided with respective laminated poles 876 are supported on respective braces 878 adjustably carried by frame members 870. The laminated poles 876 of the transducing heads 874 are in spaced overlying relation to respective larger diametral portion 880 of numeral drums 856 and 858. A pair of blocks 882 carry contacts, generally indicated at 884, in wiping engagement with the smaller diametral, or electrical contact portions 886 of the numeral drums 856 and 858.

Translation mechanism

As shown in Fig. 21, an operating key 888 is secured to an arm 890 which is pivotally mounted on a supporting shaft 892. The depression of key 888 closes a pair of contacts 894 by counterclockwise movement of an arm 896 carried by arm 890. This operates a solenoid 898 (see also Fig. 23) to cause the plunger 900 thereof to rock a lever 902 about its pivot 904, thus causing a rocking of an arm 906 to bring a plurality of sensing fingers 908 carried thereby into contact with the sensing drum 850. Solenoid 898 is initially operated from current source 910, but when contacts 894 are opened by release of the operating key 888 and the return of the same under the action of a spring 912, holding current from a source 914 maintains the energization of solenoid 898 and thereby keep the sensing fingers 908 in contact with the sensing drum. This holding current is released under the control of elements hereinafter described, at the completion of the sensing operation. A pair of contacts 916 must be closed in order that the sensing operation may begin, but these contacts are opened by movement of arm 896 upon depression of the operating key 888 and are closed upon release of that key; therefore, the sensing operation cannot begin until the operating key is released and restored to its normal position. A pair of contacts 918 are closed by a rocker arm 920 at the same time that the sensing fingers 908 are brought into contact with the drum by movement of arm 906. The sensing operation may not begin until the contacts 918 are closed, and is therefore delayed until the sensing fingers 908 are in contact with drum 850.

The depression of key 888 also zeroizes the dial segments 866 by rocking a shaft 922 and a pawl 924 carried thereby clockwise (as viewed in Fig. 21; counterclockwise as viewed in Fig. 22). This movement is imparted to shaft 922 by rocking an arm 926 thereon by means of an arm 928 of operating key lever 890 in engagement with a stud 930. Release of the pawl 924 allows the dial segments 866, bearing decimal digits 0 to 9, to rock clockwise (Fig. 22) about shafts 868 under the action of the respective springs 932, thus bringing the dial segments into positions where the 0 digits thereon are in alignment with respective windows 934 of the casing. Each time a numeral drum 856 or 858 makes one rotation during the sensing operation, its related electromagnet 872 is energized causing an armature 936 thereof to rock clockwise and thereby bring a ratchet drive 938 into contact with ratchet 940 to advance the dial segment 866 one increment. This advancing of the dial segments does not take place after a value has been found during the sensing operation since the related electromagnet 872 is not thereafter energized until a new sensing operation begins. The numeral drums 856 and 858 bear the decimal digits 00 to 99, inclusive and continuously rotate. When a correct value is sensed, the related transducing head 874 writes a magnetic spot on the larger diametral, or numeral-bearing portion 880 of its drum, and thereafter the related stroboscopic light flashes under the separate control of the magnetic spot, thereby displaying the appropriate decimal word after the sensing fingers 908 are removed from drum 850.

Control system

Fig. 23 schematically shows the complete control system for the machine. As previously stated, the sensing drum 850 carries the sensing pattern for only the first seven binary orders, which have equivalent decimal values of 0 to 127. The eighth binary order has a decimal value of 128; therefore, at the completion of one rotation of the sensing drum 850, the eighth order is made effective in the sensing sequence. As shown in Fig. 9 of the first embodiment, the sensing sequence during the eight rotations of the sensing drum is as follows: the eighth order is sensed during the second rotation; the ninth order during the third rotation; the eighth and ninth orders during the fourth rotation; the tenth order during the fifth rotation; the eighth and tenth orders during the sixth rotation; the ninth and tenth orders during the seventh rotation; and the eighth, ninth, and tenth orders during the eighth rotation. The above sequence is programmed in the present embodiment of the machine by three separate relays connected in binary counting sequence in the same manner as relays 404 in the first embodiment. These three relays are shown in Fig. 23 as 944, 946 and 948. A pulse is supplied to the coil of relay 944, which is associated with the eighth binary order, in response to each rotation of the sensing drum. This pulse may be supplied, after sensing is started, at any time during the rotation, as will be hereinafter described, and consequently relay 944 is latched down at the end of the first rotation. Relay 946 is similarly latched down at the end of the second rotation; both relays 944 and 946 are latched down at the end of the third rotation, etc., until at the end of the seventh rotation, all three of the relays 944, 946, and 948 are latched down. A fourth relay 950 is connected to this group of relays and receives the carry pulse from the tenth order relay 948 during the eighth rotation of the sensing drum. Relay 950, however, is held in its operated position by holding current from a source 952, and its function is to interrupt the circuit to solenoid 898 and thereby terminate the sensing operation by removal of the sensing fingers 908 from contact with the sensing drum.

Three additional relays 954, 956, and 958 control sets of eighth, ninth and tenth order contacts 996, 998, and 1000, respectively, which are associated directly with the sensing circuit. The function of these relays is to insure proper timing of the enablement of their related sensing orders, as hereinafter described.

A pair of sensing fingers 960 is capable of supplying a pulse from a source 962 through a pair of contacts 1056 to relay 944 as the fingers pass a conducting portion 964 on the sensing drum 850. This pulse is effective to operate the relay 944 only after a sensing sequence is begun, as will be hereinafter described. The pulse is therefore supplied only during the sensing operation and is effective to count the rotations of the sensing drum and transfer the count to relays 944, 946, and 948 so that the proper combination thereof will be in latched condition in accordance with the particular drum rotation. During the eighth rotation, this counting pulse operates relay 950 by means of the carry from relay 948, relay 950 being thereafter maintained in its energized condition by current from source 952 passing through a pair of contacts 968. The armatures of relays 944, 946, and 948 are restored from their latched conditions after the carry is made. At the completion of each rotation of the sensing drum, a pulse is supplied to circuit point 970 from a source 972 through a pair of drum contact fingers 974 and a drum contact 976. Thus, when contacts 978 are closed during the eighth rotation of the sensing drum, by energization of relay 950, the pulse from source 972 is supplied through contacts 978 to a relay 980, thereby operating the latter to open contacts 968, 982, and 984 with which it cooperates. The opening of contacts 982 interrupts the holding current from source 914 to solenoid 898, thereby removing the sensing fingers 908 from the sensing drum, and the opening of contacts 968 interrupts the holding current from source 952 to relay 950, thereby opening contacts 978.

The pulse from source 972 through sensing fingers 974 also serves to operate one or more of the relays 954, 956, and 958 provided that contacts 984, 986, and 988, with which they are respectively associated, are closed at the time. Means are also provided to hold the armatures of relays 954, 956, and 958 down for a complete rotation of the sensing drum, said means comprising a holding current supplied from a source 990 through a pair of sensing fingers 992 and a conducting strip 994 on the sensing drum 850. The operation of relays 954, 956, and 958 is, therefore, such that current supplied through sensing fingers 974 from source 972 will operate any one or more of these relays if their associated contacts 984, 986, or 988 are closed, and a relay so operated will remain energized by holding current from source 990 for the remainder of the drum rotation. It will be noted that contact strips 976 and 994 are complementary in the sense that each extends around the periphery of drum 850 only to the extent that the other does not. These relays are deenergized at the end of each rotation of the sensing drum unless their associated contacts 984, 986, or 988 are still closed, in which case energizing current is supplied from source 972 during the non-conducting period of sensing fingers 992. Three sets of contacts 996, 998, and 1000 are connected into the value sensing system circuit will be explained, and are enabled during certain complete rotations of the sensing drum under the control of the rotation-counting 944, 946, and 948.

Means are provided to place a magnetic spot on the numeral indicating portion of each numeral drum 856 and 858 through the agency of the related magnetic transducing head 874, and to thereafter employ the magnetic spot to control the flashes of a related stroboscopic light 942 each time the numeral drum passes the position attained when the sensing circuit was first completed. The operation and control are such that the sensing circuit is completed when a decimal word is attained representing the binary word contained in the banks of counter-relays. As will hereinafter appear, a relay 1002 is energized during the sensing operation, and therefore, upon the completion of the sensing circuit to find a value, a pulse from a source 1004 is supplied through a pair of contacts 1006 controlled by relay 1002 and through the B group contacts of relays 954, 956 and 958 to a relay 1008, to energize the latter relay. As the armature of relay 1008 is moved downwardly to close a pair of contacts 1010, a circuit is momentarily closed from a source 1012 through contacts 1010, a pair of contacts 1014, the transducing head 874, a pair of contacts 1016, and ground. The surge of current writes a magnetic spot on the numeral drum, and thereafter the circuit through the transducing head 874 is through a pair of contacts 1020, in engagement following the energization pulse to relay 1008, and an amplifier 1022, with the amplified current going through a circuit lead 1024 to a stroboscopic light 942; therefore, each time the magnetic spot passes between the laminated poles 876 of the magnetic head 874, a current is generated, amplified, and thereafter causes flashing of light 942. Thus, the decimal value which is displayed at the time the sensed binary word is attained on the numeral drum continues to be displayed under control of the magnetic spot.

Means are provided to erase the magnetic spots from the numeral drums under the control of the depression of the operating key 888. As the key is depressed, a pair of contacts 1026 are closed, whereupon a source 1029 supplies an erasing current to the magnetic head 874. A separate erasing head may be used if a particular magnetic head is not adapted to this multiple use. Once electromagnet 1008 is operated by the closing of the sensing circuit, it is maintained in its operated position by a holding current until the next sensing operation is initiated. This holding current is supplied through a pair of contacts 1028 from a source 1030, the latter contacts being closed when the operating key is in its raised position and being opened when the key is depressed.

The advance of the dial segments 866, is controlled after the sensing for a word is initiated and until the word is found. During this time, the segments advance one increment each time their associated numeral drums make one rotation, and the means for causing the advance comprises the electromagnet 872. The pulse for operating an electromagnetic 872 once for each rotation of its associated numeral drum is supplied from a source 1032 through a pair of contacts 1034, which are closed during the sensing operation, a pair of contacts 1036, likewise closed during the sensing operation, a pair of sensing fingers 1038, contact 1040 on numeral drum 856 or 858, and electromagnet 872 to ground. Thus, the electomagnet pulse is supplied through fingers 1038 only when the conducting portion 1040 of the numeral drum is reached. The pulse is supplied at the completion of each rotation of the numeral drum so that at the beginning of the second rotation the dial segment and numeral drum will collectively read "100" unless relay 1008 has operated during the first rotation of the numeral drum.

Relay 1002 is operated when both the sensing drum 850 and the numeral drums 856 and 858 simultaneously reach zero positions. At this time, a contact 1044 on the numeral drum is in engagement with a pair of sensing fingers 1046, and a contact 1048 of the sensing drum 850 is in engagement with a pair of sensing fingers 1050. Current from a source 1052 thus passes through fingers 1046, contact 1044, fingers 1050, contact 1048, contacts 918 and 916, and then to relay 1002 to operate the latter. Since the circuit must be completed through contacts 916 and 918, it will be clear that relay 1002 cannot be operated unless the operating key is in its raised position and the sensing fingers 908 are in engagement with the sensing drum, because this is the only time that both sets of contacts 916 and 918 are closed. Relay 1002 therefore operates the first time that zero positions are reached simultaneously by both the numeral drums and the sensing drums after depression of the operating key 888. Relay 1002 is held in an operated condition by current from a source 1054 passing through the contacts 984, which are opened, upon completion of a sensing operation, by operation of relay 980. The operation of relay 1002 also closes contacts 1056 to permit the counting pulses to be supplied to relays 944, 946 and 948 from source 962.

It has been noted that contacts 996, 998 and 1000 are associated with the eighth, ninth and tenth order relays, 954, 956 and 958, respectively, in the same manner as the sensing fingers 908 for the first seven orders of the binary bank are associated with their respective counter-relays. As stated in describing the first embodiment, the sensing circuit is completed directly through all orders which stand at 0. Thus, if an ordinal relay stands at 0, its B group contacts are connected into the sensing circuit, while if the relay stands at 1, the sensing circuit is completed through the sensing fingers associated therewith and the sensing pattern. In the present embodiment, where the contacts 996, 998 and 1000 take the place of sensing drum fingers for the eighth, ninth and tenth orders of the counter bank, current from source 1004, upon the completion of the sensing operation, passes through either the B group contacts 1062 of the tenth order relay, or the contacts 1000 thereof, if the latter are in engagement, and in like manner either the B group contacts 1060 and 1058 of the ninth and eighth order relays are connected into the circuit or their respective contacts 998 or 996 are connected into the circuit. The sensing fingers 908, the sensing pattern, and the B group contacts for the other seven ordinal relays are also connected into the sensing circuit in the same manner. These are represented in Fig. 23 by a rectangle 1064, the manner of connection being similar to that shown for relays 404 of the first embodiment.

It will be understood that all the conducting portions on both the sensing and numeral drums are so positioned that the operating times for the various relays are compensated for, and that all contacting fingers and sensing means may be adjustable to vary operating times slightly, and further, that the sensing and numeral drums may be placed slightly out of numerical alignment with one another to compensate for any time difference caused by the inductive nature of the magnetic transducing heads, so that each magnetic spot will cause the related stroboscopic light to flash at the time the correct decimal word appears squarely in the window of the machine casing.

I claim:

1. A machine adapted to translate binary system values to decimal system values comprising: accumulator means for the receiving and storing of notations of binary values and being thereby conditioned; cyclically movable indicator means carrying decimal system notations; stroboscopically energizable illumination means adapted to visually arrest a decimal notation carried by said indicator means; means including a pattern of discrete elements movable in sensing relation to said accumulator means and relatively movable with respect to said accumulator means in timed relation to the movement of said indicator means adapted to correlate the binary value condition of the accumulator means with a position of said indicator means; and means responsive to the correlating means upon correlation of said value condition and indicator means position to stroboscopically energize said illumination means.

2. A machine according to claim 1, wherein said responsive means are operable to condition said illumination means for energization and wherein means are provided under the control of said indicator means to energize said illumination means each time said position of said indicator means recurs.

3. An indicating system comprising: accumulator means for the receiving and storing of notations of binary values and adapted to be thereby conditioned; cyclically movable indicator means; electric signal transmitting means; means forming an electrical connection between said accumulator means and said signal means including circuit-making means in the form of an electrical contact pattern in sensing relation to said accumulator means, said pattern comprising a plurality of electrical contacts geometrically arranged to form a plurality of sequentially arranged binary value combinations, all contacts of each combination being adapted to be sensed in substantial unison by said accumulator means; a respective decimal notation on said indicator means corresponding to each of said combinations; and means imparting cyclic movement to said pattern in such timed relation with said indicator means that as each electrical contact combination of the pattern is brought into sensing relation with said accumulator means the corresponding decimal notation for said contact combination is at a predetermined location, said electrical connection means being operative upon the matching of a pattern contact combination with the condition of said accumulator means to activate said signal transmitting means.

4. A machine for the translation of binary system values to decimal system values comprising; accumulator means for the receiving and storing of notations of binary values and adapted to be thereby conditioned; cyclically movable indicator means; stroboscopically energizable illumination means; means forming an electrical connection between said accumulator means and said illumination means including circuit-making means in the form of an electrical contact pattern in sensing relation to said accumulator means, said pattern comprising a plurality of electrical contacts geometrically arranged to form a plurality of sequentially arranged binary value combinations, all contacts of each combination being adapted to be sensed in substantial unison by said accumulator means; a respective decimal notation on said indicator means corresponding to each of said combinations; and means imparting cyclic movement to said pattern in such timed relation with said indicator means that as each electrical contact combination of the pattern is brought into sensing relation with said accumulator means the corresponding decimal notation for said contact combination is at a predetermined location, said electrical connection means being operative upon the matching of a pattern contact combination with the condition of said accumulator means to initiate stroboscopic energization of said illumination means whereby the decimal notation at said predetermined location is visually arrested.

5. A machine for the translation of binary system values to decimal system values comprising: accumulator means for the receiving and storing of notations of binary values and adapted to be thereby conditioned; cyclically movable indicator means; stroboscopically energizable illumination means; pattern means in sensing relation to said accumulator means comprising a plurality of sequentially arranged combinations of elements, all elements of each combination of elements being adapted to be sensed in substantial unison by said accumulator means, and being representative of a binary value; a respective decimal notation on said indicator means for each of said combination; means operable to bring the first in sequence of said elements into sensing relation with said accumulator means as the equivalent decimal notation thereof, also the first in sequence, is at a viewing locus; means for synchronizing the movement of said indicator means and sensing means to maintain this positional correlation between succeeding combinations of elements and succeeding decimal notations; and means responsive to the matching of a combination of elements with the condition of said accumulator means to initiate stroboscopic energization of said illumination means whereby the decimal notation at said viewing locus is visually arrested.

6. The combination as set forth in claim 5, wherein said means responsive to said matching is operable to condition said illumination means for energization, and wherein means are provided under the control of said indicator means to energize said illumination means each time the indicator means reaches the position at which said matching occurred, the rate of movement of said indicator means being of sufficient magnitude to impart a stroboscopic effect to said illumination means.

7. A machine for the translation of binary system values to decimal system values comprising: accumulator means for the receiving and storing of notations of binary values and adapted to be thereby conditioned, said means comprising at least a pair of banks of counter units, the units of one bank being operable to receive and store binary values having decimal equivalents of 1,000 and multiples thereof, and the units of the other bank being operable to receive and store binary values, having decimal equivalents of the hundreds degree, including the binary values representative of the difference between the binary values of said first-mentioned bank and corresponding conventional-binary values having decimal equivalents of 1024 and multiples thereof; indicator means comprising at least a pair of cyclically movable members, one of said members being associated with said second-mentioned bank and carrying a series of spaced consecutive decimal values of the hundreds degree, and the other of said members being associated with said first-mentioned bank and carrying a series of spaced consecutive decimal values, each value being representative of a multiple of 1,000; stroboscopically energizable illumination means operable to visually arrest at a viewing locus a decimal value notation which may be composed of a decimal value carried by each of said cyclically movable members, said notation corresponding to the binary system notation stored by said accumulator means, said energizable means comprising a strobotron for each cyclically movable member; movable means in sensing relation to said accumulator means comprising a plurality of sequentially arranged combinations of elements, each combination of elements being representative of a binary value notation having an equivalent decimal value on each of said cyclically movable members and said combinations of elements being so arranged in relation to said accumulator means that any of said combinations is brought into simultaneous sensing relation with both of said banks of counter units; means operable to bring the first in sequence of said combinations of elements into sensing relation with both banks of said accumulator means as the equivalent decimal value of said combination on each of said cyclically movable members is at said viewing locus; means for synchronizing the movement of said cyclically movable members and said movable means to maintain this positional correlation between succeeding combinations of elements and succeeding equivalent decimal values on each of said cyclically movable members; means responsive to the matching of a combination of elements with the condition of one bank of counter units to initiate energization of the strobotron for the cyclically movable member associated with said bank; and means responsive to the matching of a combination of elements with the condition of the other bank of counter units to initiate energization of the strobotron for the cyclically movable member associated therewith.

8. The combination as set forth in claim 7, wherein said means responsive to said matching are operable to condition said strobotrons for energization, and wherein means are provided under the separate control of each cyclically movable member to energize the strobotron associated therewith each time said member reaches the position at which said matching occurred, the rate of movement of said cyclically movable members being of sufficient magnitude to impart a stroboscopic effect to said strobotrons.

9. An indicating system comprising: first and second cyclically movable members adjacently arranged and similarly oriented; a plurality of indicia markings carried on the surface of said members, the markings together constituting a plurality of summative indication combinations; drive means for imparting cyclic movement to said members to cause the indicia markings thereof to travel repetitively, past a predetermined reference locus; a separate light source for each member within surface-illuminating distance thereof; means selectively operable to record a codified representation of an indication combination; means operating in sensing relation to said selectively operable means and in timed relation to the movement of said members to separately energize the light sources for said first and second members when the markings thereof which are constituents of the desired indication combination are at said reference locus; and separate means including a device moving synchronously with one of said members and under the control thereof to thereafter cause repetitive energization of said light sources coincidentally with the arrival at said reference locus of the respective constituent markings, whereby the constituent markings of the desired indication combination, although physically out of alignment, are stroboscopically arrested in visual alignment.

10. An indicating system comprising: at least a pair of cyclically movable members; a plurality of spaced indicia markings carried on the surface of each of said members in adjacent relation, the markings of one member taken in conjunction with the markings of the other member constituting a plurality of summative indication combinations; drive means for imparting cyclic movement to said members to cause the markings of each to travel repetitively past a predetermined reference point; a separate light source for each member within illuminating distance of the surface portion thereof adjacent its reference point, means for selecting an indication combination comprising a marking on one member and a marking on the other member; means for each light source in association with said selector means and responsive thereto to cause energization of its light source when the constituent marking of the selected combination carried by the member associated with the light source reaches the reference point; and separate means including a device moving in timed relation with said members and under the control thereof to thereafter cause energization of the associated light source coincidentally with each arrival at the reference point of the said constituent marking, and de-energization of the light source upon the movement away from said reference point of said marking, whereby the constituent markings of the desired indication combination, regardless of disparity as to physical phase, are stroboscopically arrested in visual phase.

11. An indicating system comprising: at least a pair of cyclically movable members; a plurality of spaced indicia markings sequentially arranged on each of said members, the markings of one member taken in conjunction with the markings of the other member constituting a plurality of marking combinations susceptible of being indicated or disclosed; drive means for imparting synchronous cyclic movement to said members with respect to a viewing locus; a strobotron for each member; means selectively responsive to the position of each member to initiate separate operation of each strobotron to illuminate at said viewing locus by means of stroboscopic pulsations an indicia marking on each member, the markings thus illuminated constituting one of said marking combinations, and said markings being in visual phase, regardless of disparity as to the physical phase; and separate means including a device moving in timed relation to the cyclic movement of said members and under the control thereof to thereafter control the operations of said strobotrons.

12. A binary order value accumulator adapted to receive binary input values corresponding to the conventional-binary notation system and translate said values to a split-binary system, wherein the binary orders corresponding to the eleventh order and above in the conventional notation have decimal equivalents of one thousand and multiples thereof, and wherein the hundreds value residues of said eleventh and above orders are entered into the group of binary orders corresponding to the tenth order and below in conventional notation, said accumulator comprising: at least two banks of counter units, the first of said banks embodying a unit for each of the first ten orders of the binary system, and the second of said banks embodying a unit for each of a series of successive orders from the eleventh binary order upward, the counter units in each bank being connected by means responsive to the input of a binary value to a unit and the presence in said unit of a value to transfer a value to the next succeeding higher order unit, said means interconnecting the tenth order counter unit of the first bank and the eleventh order, or first, counter unit of the second bank; means to feed binary values into said units; and means forming a connection between said feed means and predetermined combinations of units of the first bank adapted upon the input of a value to a unit of said second bank to transfer to the combination of first bank units with which said unit is associated binary values equivalent to the hundreds value constituting the difference between the decimal equivalent of the conventional-binary system order corresponding to said second bank unit and the thousands value constituent of said decimal equivalent.

13. A binary value accumulator comprising: a first counter bank for registering binary values which are equivalent to decimal values "A," and a second binary counter bank having at least one stage for registering binary values which are equivalent to decimal values $B \times 10^C$, where "A," "B" and "C" are decimal whole numbers, where $10^C$ is greater than "A," where "A" and "B" are each equal to or greater than 0, and where "C" is greater than 0; binary carry means interposed between successive stages of each bank; binary carry means interposed between the highest value stage of the first bank and the lowest value stage of the second bank; means for entering binary values into the stages of said banks; a connection between the lowest value stage of the second bank and a predetermined combination of stages in the first bank, said connection being operable, in response to the occurrence of a binary carry from the highest value stage of the first bank to the lowest value stage of the second bank, for entering binary values into said combination of stages, the summation of the decimal equivalents of the values entered into said combination of stages being equal to: the decimal equivalent of the value carried from the first bank to the second bank, minus the decimal value $10^C$.

14. A binary value accumulator comprising: an "$m$" stage first counter bank for registering binary values which are equivalent to demical values "A," and a second binary counter bank having at least one stage for registering binary values which are equivalent to decimal values $B \times 10^C$ where "A," "B" and "C" are decimal whole numbers, where $10^C > A \geq 0$, where $B \geq 0$, where $C > 0$, and where $2^m > 10^C > 2^{m-1}$; binary carry means interposed between successive stages of each bank; binary carry means interposed between the highest value stage of the first bank and the lowest value stage of the second bank; means for entering binary values into the stages of said banks; a connection between the lowest value stage of the second bank and a predetermined combination of stages in the first bank, said connection being operable, in response to the occurrence of a binary carry from the highest value stage of the first bank to the lowest value stage of the second bank, for entering binary values into said combination of stages in the first bank, the summation of the decimal equivalents of the values entered into said combination of stages being equal to the decimal value $(2^m - 10^C)$.

15. A binary value accumulator comprising: counter units for each of a series of consecutive binary orders adapted to register all binary values having a decimal equivalent of less than a thousand and a counter unit for at least the eleventh binary order adapted to register a binary value having a decimal equivalent of one thousand and twenty-four; means forming a connection between each of said units responsive to the entry of a binary value into any one of said one degree units and the presence in said unit of a value to carry a value to the counter unit for the next higher binary order; and means forming a connection between the unit for the eleventh order and the units for the fourth and fifth binary order operable upon the carry of a value from the tenth to the eleventh order units to enter values into said fourth and fifth order units.

16. A binary value accumulator comprising a first counter bank composed of "$m$" stages for registering binary values which are equivalent to decimal values "A," and a second binary counter bank composed of "$x$" stages for registering binary values which are equivalent to decimal values $B \times 10^C$, where "A," "B" and "C" are decimal whole numbers, where $10^C > A \geq 0$, where $B \geq 0$, where $C > 0$, and where $2^m > 10^C > 2^{m-1}$; binary carry means interposed between successive stages of each bank; binary carry means interposed between the highest value stage of the first bank and the lowest value stage of the second bank; means for entering binary values into the stages of said banks; a respective connection between each stage of the second bank and a corresponding predetermined combination of stages in the first bank, said connection being operable, in response to the entry of a binary value into the $n$th stage of the second bank where $n$ $x$, for entering binary values into the corresponding combination of stages in the first bank, the summation of the decimal equivalents of the values entered into said combination of stages being equal to the decimal value $(2^{n-1})(2^m - 10^C)$.

17. In a machine of the class described, a sensing pattern comprised of a plurality of columnar files each having a plurality of spaced contacts, said files being representative of a plurality of successive orders of the binary system and said contacts being representative of binary order values, said pattern having a plurality of ranks consecutively representative of a range of decimal numbers, each file having the contacts thereof so arranged that the sum total of decimal system equivalents of the contacts occupying any one rank is equal to the decimal system number of the rank, other elements to be sensed associated with said pattern and means in sensing relation to said pattern and to said other elements to be sensed operable to reptitively sense said pattern in variable combination with said other elements.

18. In a machine of the class described, a sensing pattern arranged in closed path conformation comprising: a plurality of contacts representative of order values of the first seven orders of the binary system, said contacts being geometrically arranged to occupy seven columnar files and 128 ranks, the files representing said seven orders and the ranks being representative of the decimal numbers from 0 to 127, each file having the contacts thereof so arranged that the sum total of decimal system equivalents of the contacts occupying any one rank is equal to the decimal system number of the rank; and continuous contact strips representative of each of the eighth, ninth and tenth binary orders in spaced relation to each other and uniformly arranged in slightly spiralled relation to said files.

19. In a machine of the class described, the sensing pattern as set forth in claim 18, in combination with: means for imparting cyclic movement to said pattern; fixed sensing elements for said files; sensing elements for said continuous strips laterally movable with respect to said pattern; and means operable to cause lateral movement of the sensing elements for said strips in timed relation to the movement of said pattern to enable variable combinative sensing of said strips and files.

20. In a machine of the class described, the combination of: binary order value input means adapted to provide binary values based on the conventional-binary system notation in which the decimal value equivalents of the tenth and above binary order values are 1024 and multiples thereof; value receiving means adapted to receive and store binary values in accordance with a different notation system in which the decimal value equivalents of the tenth and above binary order values are 1,000 and multiples thereof; and a transfer pattern relatively movable with respect to said value input means and in sensing relation therewith adapted to convert the conventional notation input to said different notation system and transfer said converted input to said value receiving means.

21. The combination as set forth in claim 20, wherein said transfer pattern embodies means for factoring an input binary value of the tenth and above binary orders into the following constituents: A binary value representing in said different notation system a decimal equivalent of a multiple of 1,000, and one or more binary values having a summative decimal equivalet of that multiple of 24 representing the decimal value difference between the factored binary value and said binary value constituent representing a multiple of 1,000; and means for transferring said constituent values to said value receiving means.

22. In a machine of the class described, a transfer pattern comprising: a plurality of input value contacts and a plurality of output value contacts arranged in predetermined fashion to reside within vertical columnar paths representative of a plurality of successive binary orders, including binary orders having decimal value equivalents below 1,000 and binary orders having decimal value equivalent above 1,000, each order having an input contact and an output contact in horizontal alignment, and each order with a decimal equivalent above 1,000 having associated therewith other sets of contacts, there being an input value contact and an output value contact in each set in horizontal alignment, said output contacts being located in the columnar paths of lower binary orders and said input contacts and said input contacts being located in the columnar path representative of said order having a decimal equivalent above 1,000, the output contacts of the sets for each over 1,000 order being so located in the paths of said lower binary orders that the summative decimal equivalent value of said output contacts, as dictated by the order-path positioning thereof, is equal to the decimal value difference between the decimal equivalent of the order having the corresponding input contacts and the nearest multiple of thousand value thereto based upon the progression 1, 2, 4, 8, 16, etc.

23. The transfer pattern as set forth in claim 22, wherein all of said input contacts are so disposed in vertically spaced relation with respect to each other that only one of said contacts resides at any given horizontal level.

24. An indicating system comprising: value entering means adapted to receive and store mathematically codified representations of numerical values of a series and to be thereby conditioned; a cyclically movable member carrying a sensing pattern provided with a plurality of combinations of contacts consecutively representative in mathematical code of the progressively increasing numerical values of a series; means for moving said member in sensing relation with said value entering means to match the condition of the latter with a combination of pattern contacts of the former; indicator means movable in timed ratio with said member and progressively positioning at a locus numerical units corresponding to the contact combinations in sensing relation with said value entering means; and means responsive to the matching of the condition of the value entering means with a combination of contacts to disable movement of said indicator means.

25. In an indicating system, a rotatable drum member; a full series of numerical data units sequentially arranged on the periphery of said member; means for driving said member; a dial member in juxtaposition to said drum member; a full series of numerical data units representative of a next higher degree sequentially arranged on the periphery of said dial member; a common viewing locus for adjacent surface portions of said members at which data units on one member may be read with units on the other member to constitute together whole numbers; means responsive to the movement of said drum member to rotatably advance the dial member a single data unit for each cycle of movement of the series of numerical data of the drum member; a strobotron means operable when a selected whole number reaches said viewing locus to disable further movement of said dial member; and means responsive to each subsequent positioning of the drum member at which said whole number is at said viewing locus to energize said strobotron.

26. In a binary value indicating system adapted to receive input binary values and provide, as an output, decimal values, an intermediate component of the system comprising: a value transfer pattern having in wiping engagement therewith a plurality of spaced units adapted to columnarly traverse said pattern, each of said units being representative of a binary order, a series of order value contacts on the pattern residing within the paths of traverse of said units, each series of contacts including a plurality of order value output contacts for each order value input contact, said contacts being offset laterally and longitudinally from each other so as to extend substantially diagonally of said pattern, the contacts of the series being successively representative of multiples of values, and means including said spaced units to selectively relate said contacts with other binary order contact patterns.

27. In a machine for the handling of binary values, a first binary value accumulator comprising a series of counter units representative of a succession of binary orders, with adjacent ones of said units being connected together by means operable upon the input of a binary value to a unit and the presence therein of a value to carry a value to the unit representative of the next higher, or adjacent, binary order; a second binary value accumulator comprising a series of counter units representative of a succession of binary orders, with adjacent ones of said units being connected together by means operable upon the input of a binary value to a unit and the presence therein of a value to carry a value to the unit representative of the next higher, or adjacent, binary order; means for multiplying a value represented by the value condition of said second accumulator by a given value and adding values representative of the product of said multiplication into said first accumulator comprising sensing means for the counter units of each of said accumulators; and movable contact-bearing pattern means operable to interconnect units of said second accumulator with units of said first accumulator for the transfer from said second accumulator to said first accumulator of values representative of the product of said multiplication.

28. In an indicating system having a cyclically movable indicia bearing member; a strobocopically operable light source associated with said member and adapted to visually arrest any given unit of indicia on said member; first means operable to record a codified representation of any given unit of indicia on said member; and second means operating in sensing relation to said first means and in timed relation with the movement of said member operable to initially energize said light source: the provision of means independent of said first and second means to recurrently energize said light source after the initial energization thereof; and light control means operable under control of said first and second means for initiating operation of said independent means.

References Cited in the file of this patent

UNITED STATES PATENTS

| Number | Name | Date |
|---|---|---|
| 1,933,650 | Bascom | Nov. 7, 1933 |
| 2,192,612 | Lang | Mar. 5, 1940 |
| 2,278,993 | Johnson | Apr. 7, 1942 |
| 2,318,591 | Couffignal | May 11, 1943 |
| 2,432,454 | Skellett | Dec. 9, 1947 |
| 2,444,042 | Hartley | June 29, 1948 |
| 2,452,568 | Harrison | Nov. 2, 1948 |
| 2,456,169 | Bellamy | Dec. 14, 1948 |
| 2,510,093 | Ferguson et al. | June 6, 1950 |
| 2,510,485 | Vossberg | June 6, 1950 |
| 2,521,788 | Grosdoff | Sept. 12, 1950 |